(12) United States Patent
Marks et al.

(10) Patent No.: US 6,971,110 B1
(45) Date of Patent: Nov. 29, 2005

(54) SYSTEM AND METHOD TO PACE EVENT SHARING COLLABORATION ACROSS MULTIPLE DISTRIBUTED APPLICATIONS

(75) Inventors: John Marks, Ft Collins, CO (US); Todd M. Spencer, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/507,427

(22) Filed: Feb. 19, 2000

(51) Int. Cl.[7] ............................................. G06F 9/46
(52) U.S. Cl. ..................................... 719/318; 718/106
(58) Field of Search ............................... 709/318, 207, 709/200, 310; 719/318; 718/106

(56) References Cited

U.S. PATENT DOCUMENTS

| | | | | |
|---|---|---|---|---|
| 4,942,540 A | * | 7/1990 | Black et al. ................. | 709/228 |
| 5,550,827 A | * | 8/1996 | Fernstrom .................... | 370/392 |
| 5,768,528 A | * | 6/1998 | Stumm ........................ | 709/231 |
| 5,805,846 A | * | 9/1998 | Nakajima et al. ............ | 345/753 |
| 5,844,553 A | * | 12/1998 | Hao et al. ..................... | 345/733 |
| 6,097,739 A | * | 8/2000 | Yamashita ................... | 370/528 |
| 6,167,358 A | * | 12/2000 | Othmer et al. .............. | 702/188 |
| 6,195,680 B1 | * | 2/2001 | Goldszmidt et al. ........ | 709/203 |
| 6,389,473 B1 | * | 5/2002 | Carmel et al. .............. | 709/231 |

* cited by examiner

*Primary Examiner*—Sue Lao
*Assistant Examiner*—Andy Ho

(57) ABSTRACT

A system and method provides pacing of window correlation events associated with application windows that are shared with corresponding windows in remote applications. In particular, the system has local application sharing logic that receives events to be shared from a local application, and paces the transmission of these events to be shared to a remote application sharing logic. The remote application sharing logic receives the events to be shared from the local application sharing logic, and transmits the events to at least one corresponding remote application for processing. The present invention can also be viewed as providing a method for pacing the correlation of events associated with a local application that are shared with at least one corresponding remote application.

17 Claims, 24 Drawing Sheets

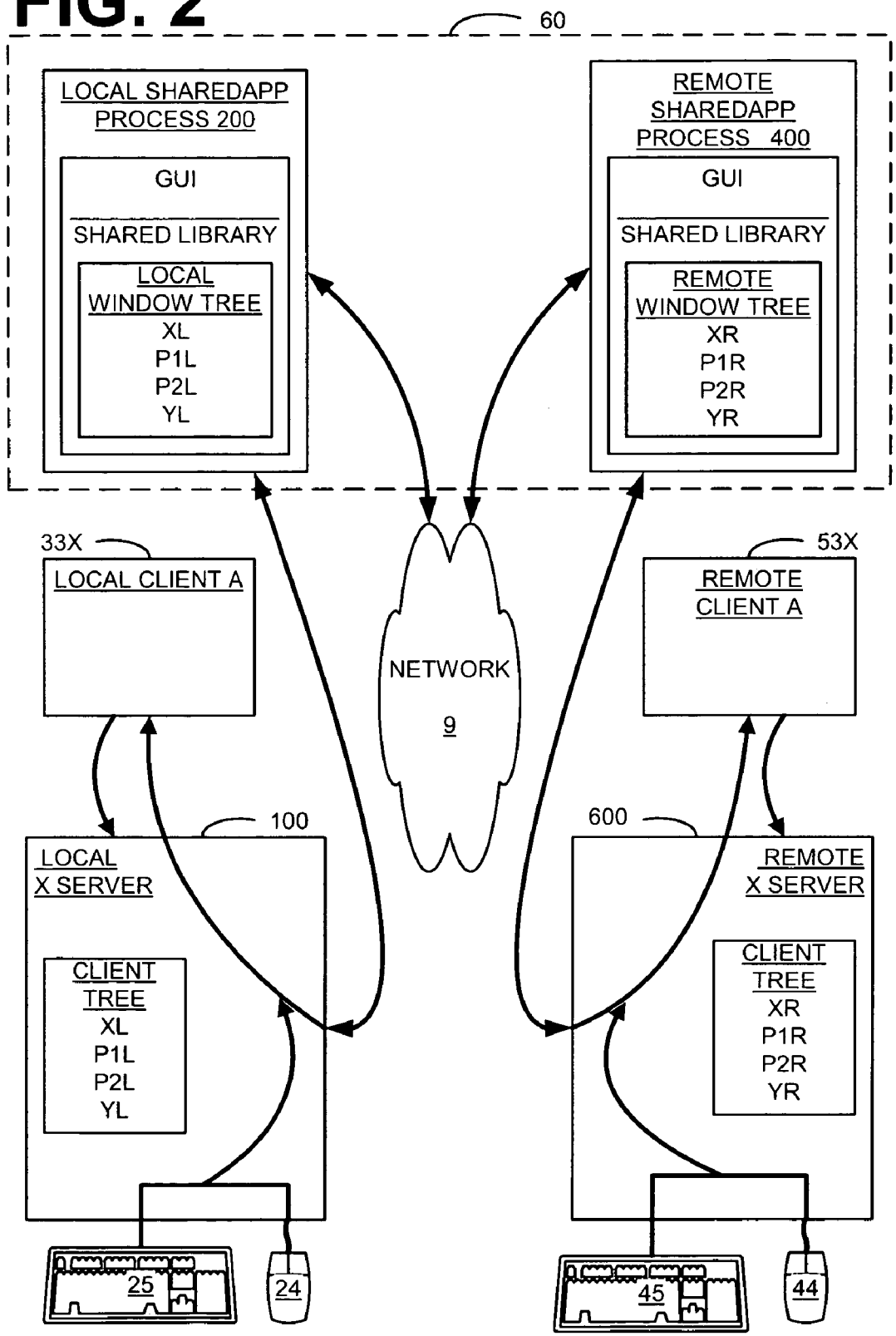

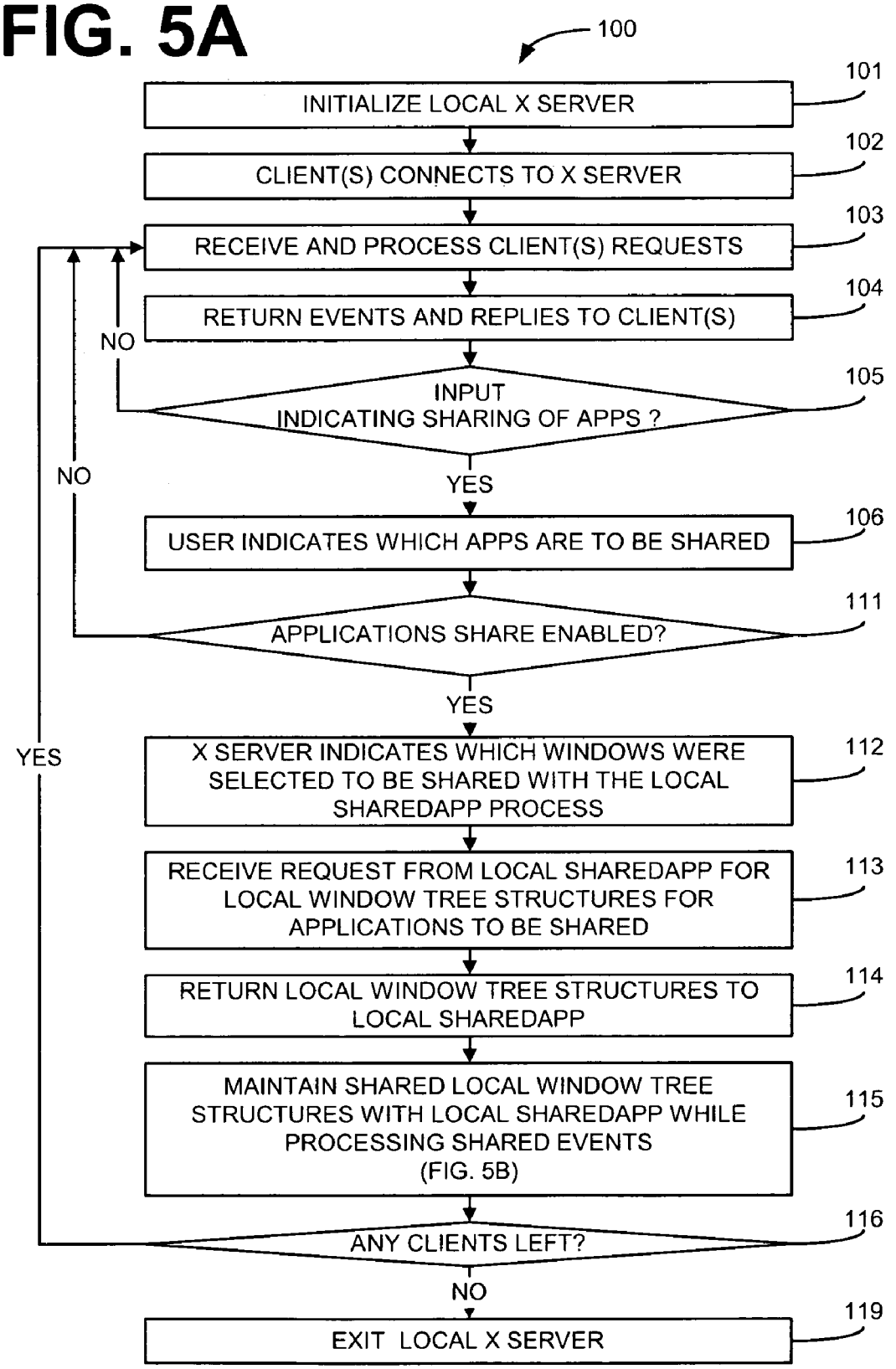

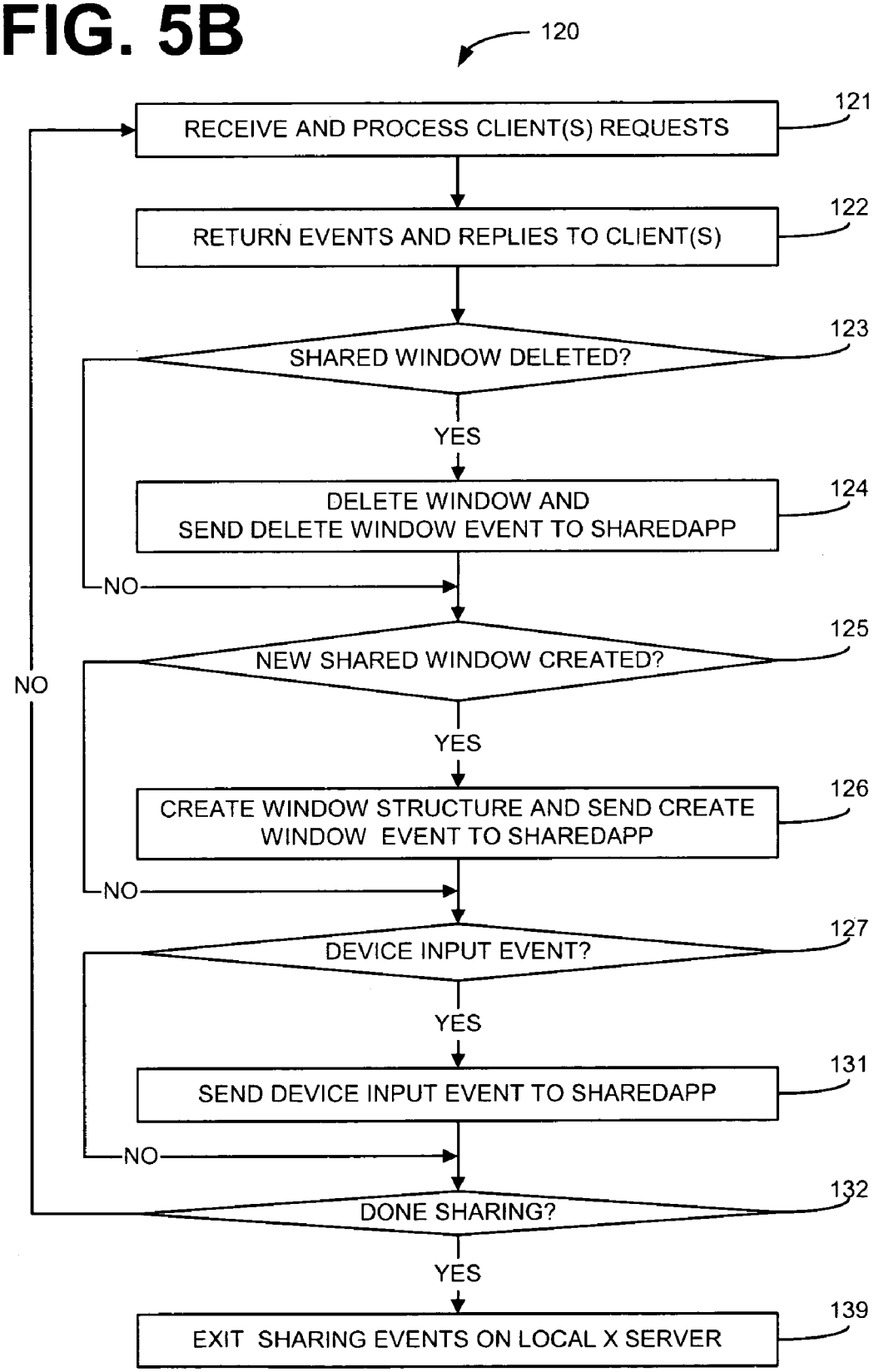

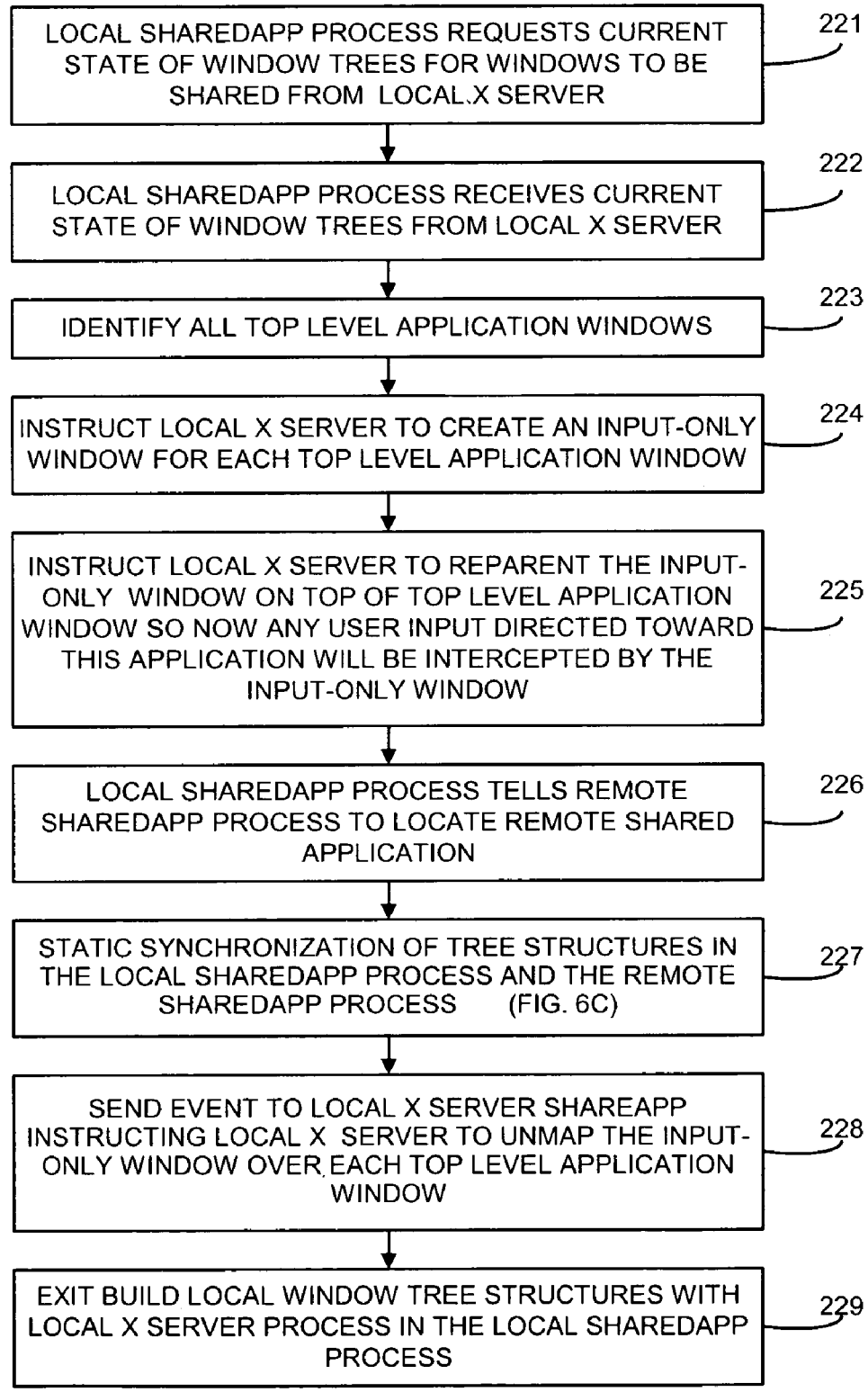

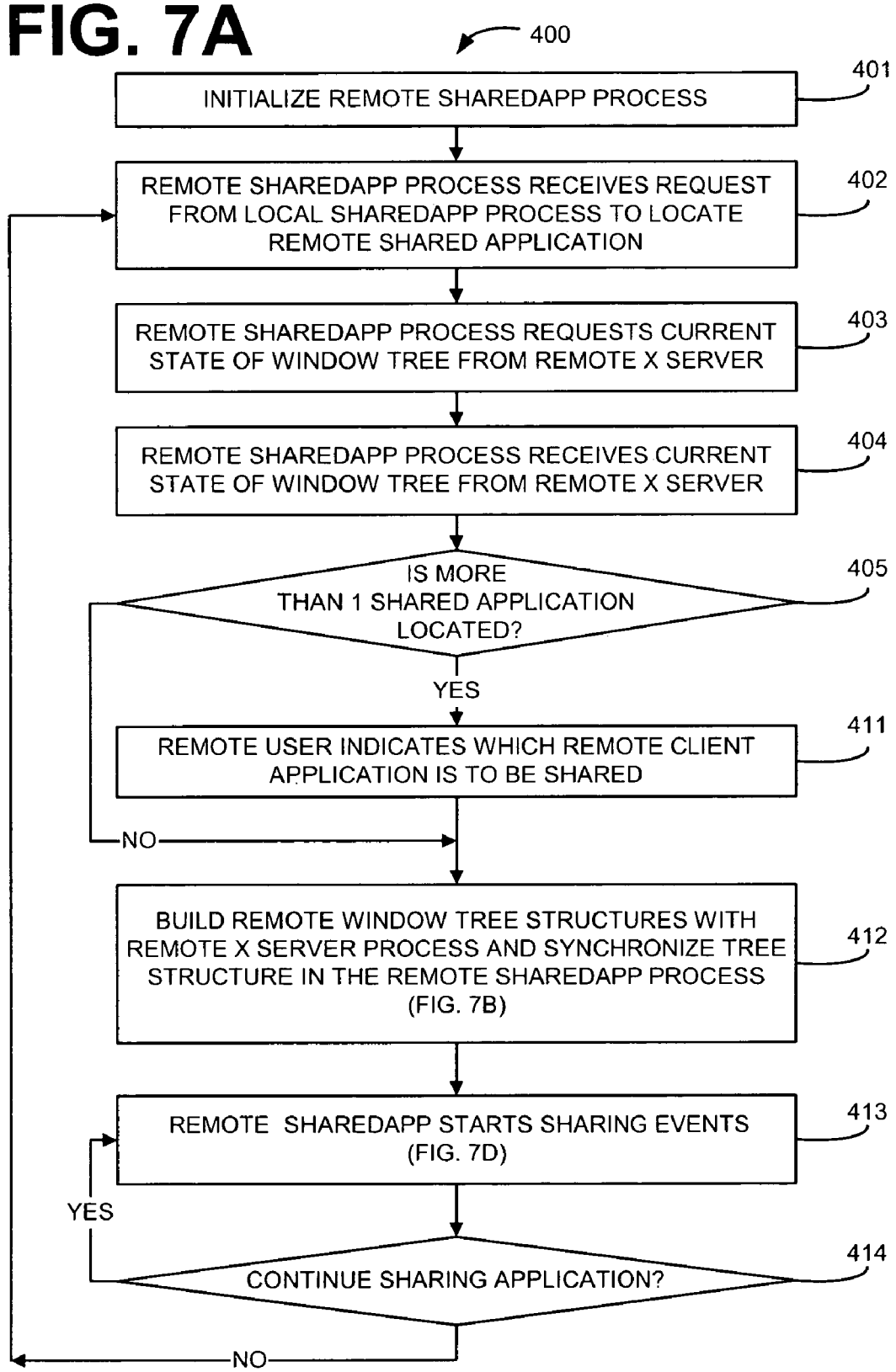

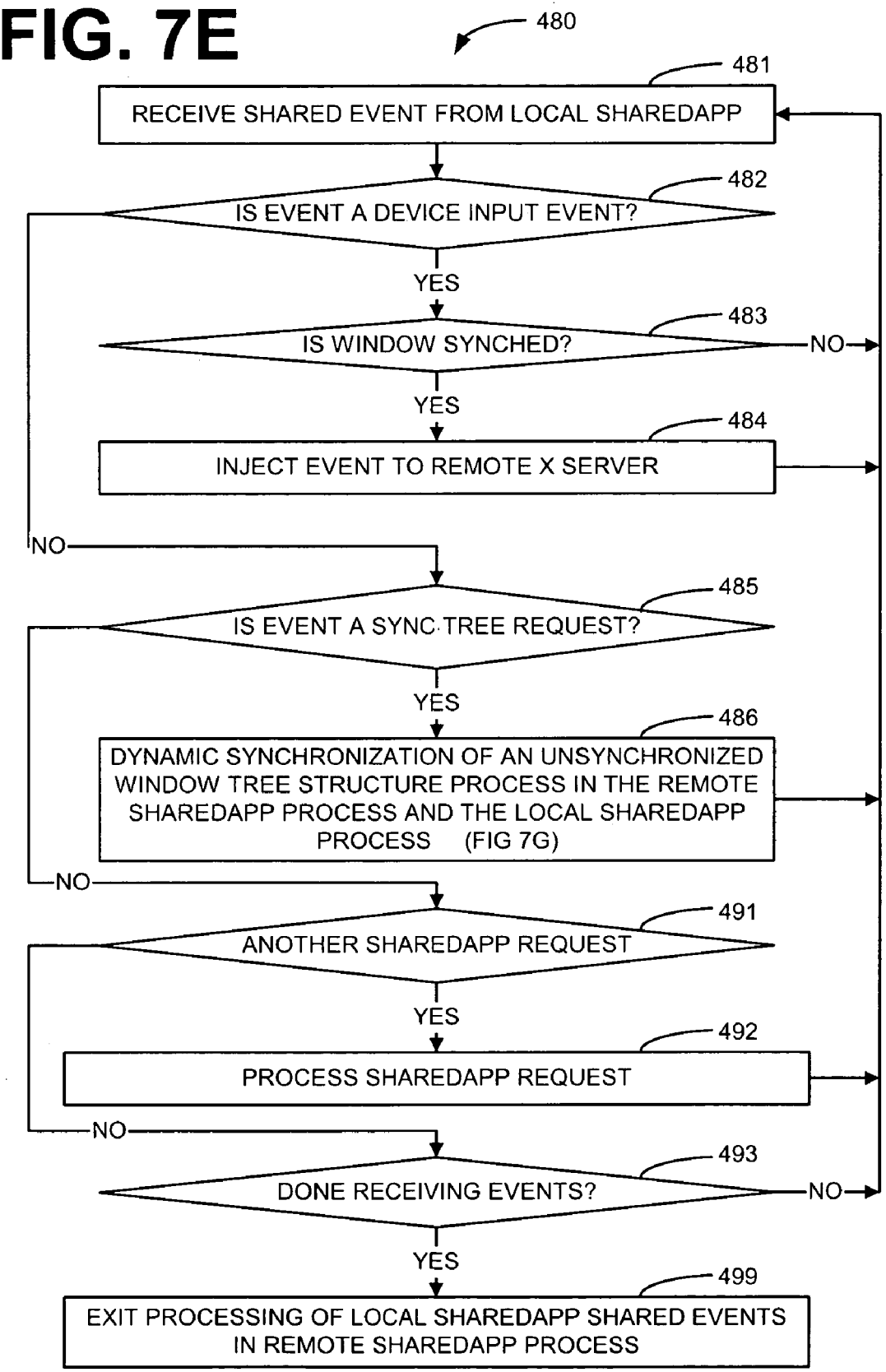

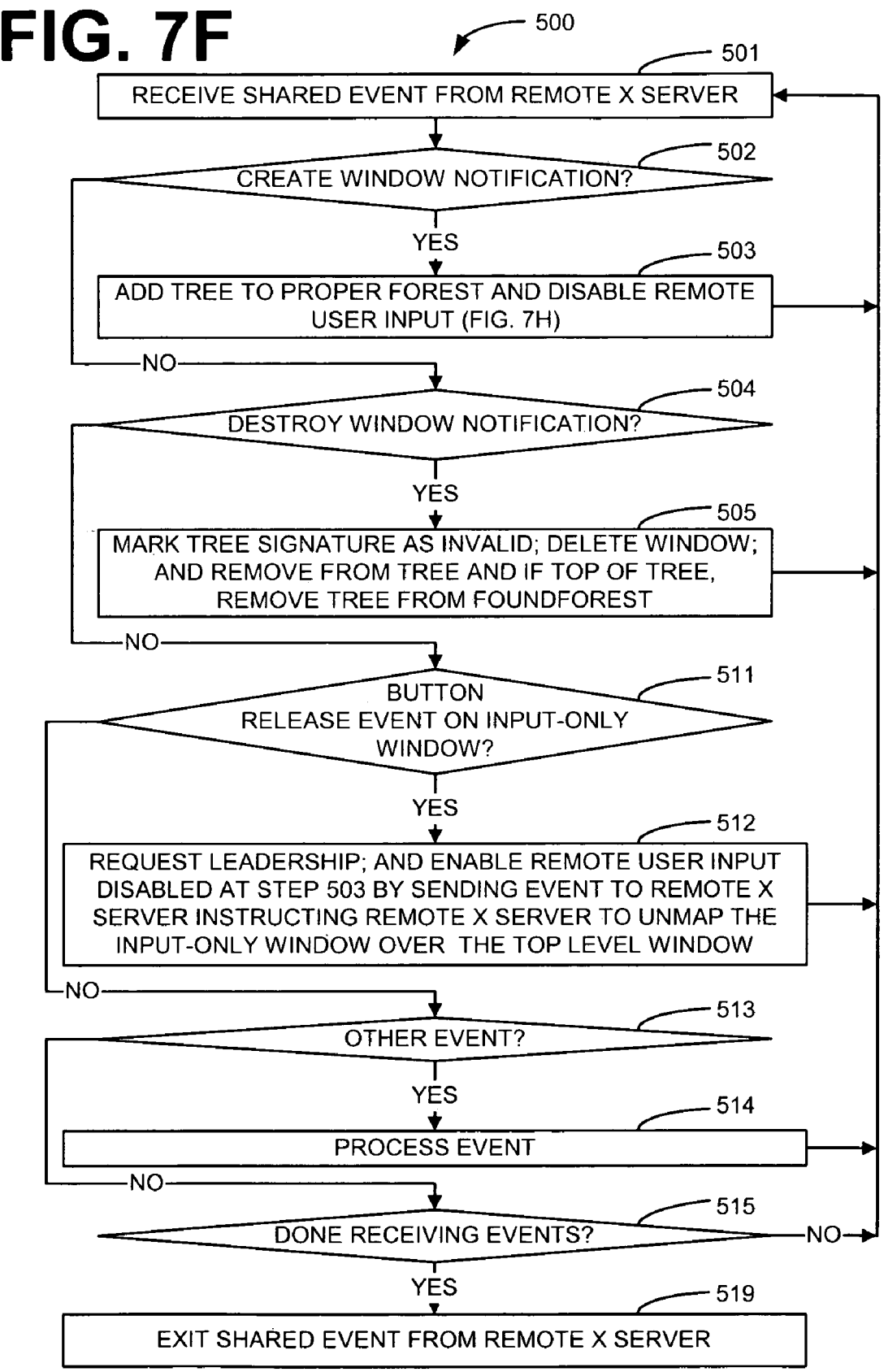

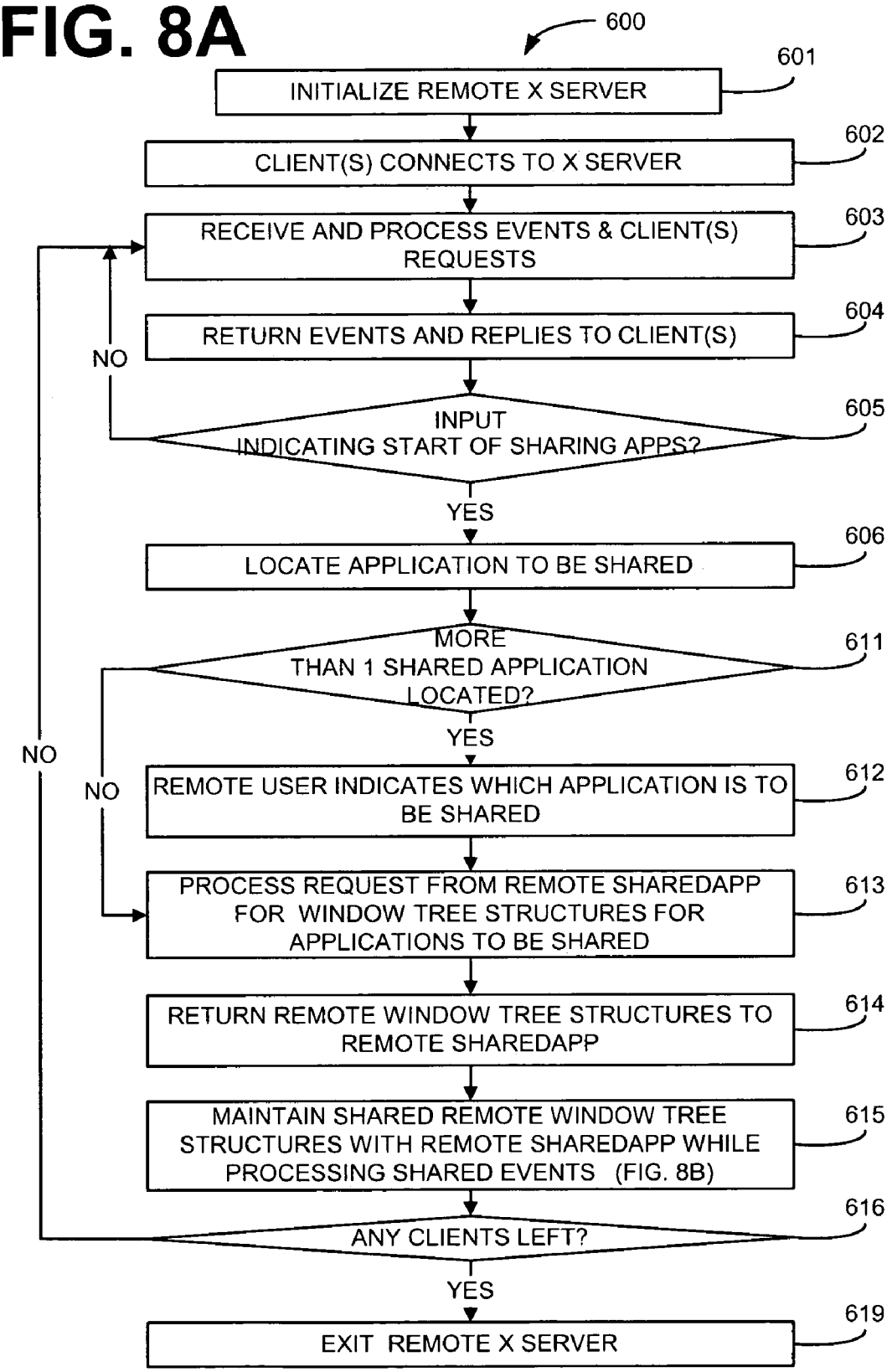

SYSTEM AND METHOD TO PACE EVENT SHARING COLLABORATION ACROSS MULTIPLE DISTRIBUTED APPLICATIONS

TECHNICAL FIELD

The present invention is generally related to computer systems and software that support multiple distributed applications and, more particularly, is related to a system and method for pacing event sharing collaboration across possible distributed applications.

BACKGROUND OF THE INVENTION

Industries that manufacture motor vehicles, airplanes and other complex mechanical equipment require designers and engineers to work concurrently on the same large complex design. The ability to work concurrently on the same design allows multiple users to collaborate on design changes in real-time and both reduce the overall design time and improve the quality of the final designed product.

Computer systems allow designers and engineers to electronically capture and manipulate multidimensional design graphics. The computer software that electronically captures, displays and manipulates graphics displayed on a computer screen is generally referred to as an application program or application. For more than one user to view or work on the same electronically captured 3-D intensive graphic, text, or set of numbers at the same time, the application must be shared with each user workstation site. The shared application should provide concurrent and consistent views of the same design graphics in real-time at remote user workstations. This changing design trend from sequential to concurrent processed design efforts can improve productivity. To address this evolution, systems and methods must be capable of simultaneously sharing and managing dynamic execution of multiple existing applications at remote workstations.

When doing event-sharing collaboration across low-bandwidth connections, the events shared from the leader application to the remote applications might be greatly delayed. To neutralize this problem, the leader application (i.e. leader process) needs a feedback mechanism to indicate how well the remote applications (i.e. listener processes) are able to keep up with the event stream. The leader application also needs the ability to control the rate at which events are shared so that the collaboration session is properly paced.

Currently, the event sharing collaboration across multiple distributed applications (i.e. processes) technology lacks the capability of the leader application (i.e. leader process) to monitor how well the remote applications (i.e. listener processes) are able to keep up with, and provide the leader application (i.e. leader process) with the ability to control the rate at which the events are shared for proper pacing.

Thus, a heretofore unaddressed need exists in the industry to address the aforementioned deficiencies and inadequacies.

SUMMARY OF THE INVENTION

The present invention provides a system and method for pacing event-sharing collaboration across multiple distributed applications.

Briefly described, in architecture, the system can be implemented as follows. Local application sharing logic receives events to be shared from a local application, and paces the transmission of these events to be shared to a remote application sharing logic. The remote application sharing logic receives the events to be shared from the local application sharing logic, and transmits the events to at least one corresponding remote application for processing.

The present invention can also be viewed as a method for pacing the correlation of events associated with a local application that are shared with at least one corresponding remote application. In this regard, the method can be broadly summarized by the following steps: (1) transmitting the events to be shared from the local application; (2) receiving events to be shared with local application sharing logic; (3) pacing the transmission of the events to be shared from the local application sharing logic to remote application sharing logic; (4) receiving events to be shared from the local application sharing logic; and (5) transmitting the events to the at least one corresponding remote application for processing.

Other features and advantages of the present invention will become apparent to one with skill in the art upon examination of the following drawings and detailed description. It is intended that all such additional features and advantages be included herein within the scope of the present invention.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 2 is a block diagram illustrating an example of the process interaction between the local X server, local sharedapp logic and local clients processes, and remote X server, remote sharedapp and remote clients processes.

FIGS. 5A and 5B are flow charts collectively illustrating an example of the local X server in the window correlation system of the present invention, as shown in FIGS. 1, 2, 3A and 4.

FIG. 6B is a flow chart of an example of the build local window tree structure process in the local sharedapp process in the window correlation system of the present invention, as shown in FIG. 6A.

FIG. 7A is a flow chart of an example of the remote sharedapp process in the window correlation system of the present invention, as shown in FIGS. 3 and 4.

FIG. 7E is a flow chart of an example of the processing of local sharedapp events in the remote sharedapp process in the window correlation system of the present invention, as shown in FIG. 7D.

FIG. 7F is a flow chart of an example of the processing of remote X server events process in the remote sharedapp process in the window correlation system of the present invention, as shown in FIG. 7D.

FIGS. 8A and 8B are flow charts collectively illustrating an example of the remote X server in the window correlation system of the present invention, as shown in FIGS. 1, 2, 3B and 4.

DETAILED DESCRIPTION OF THE PREFERRED EMBODIMENT

Figure 1:
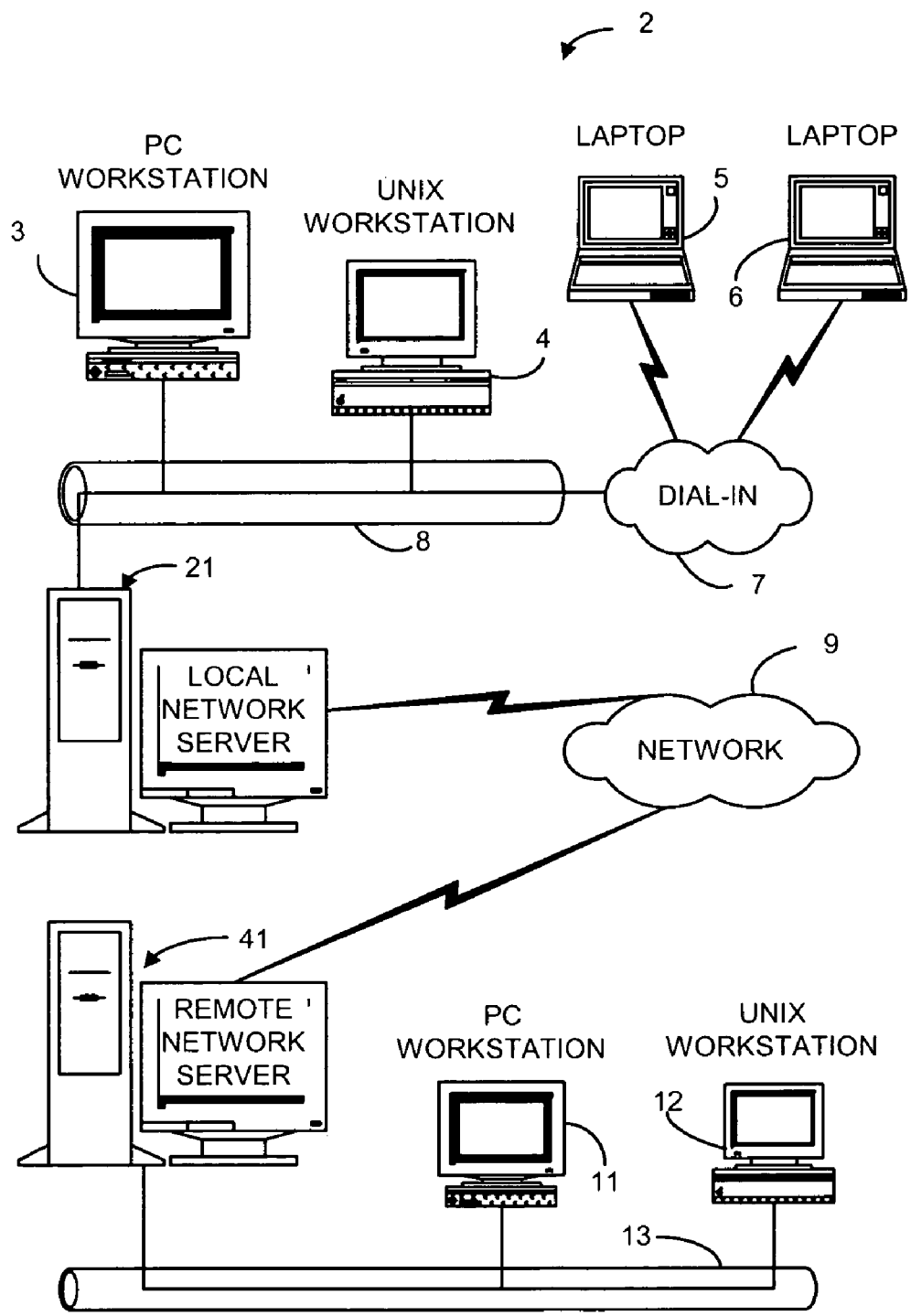
FIG. 1 is a block diagram illustrating an example of the architecture for the local and remote client/server systems of the present invention.

The present invention will now be described in detail with specific reference to the drawings. While the invention will be described in connection with these drawings, there is no intent to limit it to the embodiment or embodiments disclosed therein. On the contrary, the intent is to cover all alternatives, modifications, and equivalents included within the scope of the invention as defined by the appended claims.

The present invention provides a system and method for pacing events associated with local application windows, to be shared with corresponding windows in remote applications. A major benefit of the present invention allows for multiple application windows to share events, associated with corresponding windows in remote applications, with confidence that corresponding windows in remote applications are keeping pace with shared events associated with the multiple application windows.

The event-sharing collaboration system assumes that multiple distributed applications are concurrently running. Of the applications assumed to be running, there is a leader of the collaboration session and one or more listeners or followers. The leader is a user that interacts with the shared application through a set of input devices (i.e., a mouse or keyboard). The input events generated by the leader, through the input devices, drive the leader application. The event sharing collaboration system has a mechanism to intercept these input events and share them with the remote applications. The input events are injected into the remote applications to make it appear as if these events were generated by the input devices attached to the remote system.

As the leader application interacts with the input devices, many input events are generated. As these leader application events are sent to the local application to be processed, they are also sent to the remote applications. The remote applications will receive the input events with a certain amount of delay from those sent to the local application. The amount of delay is dependent upon the speed of the network connection that connects the system, as well as the ability of the remote systems to process the events. The larger the delay, the more the leader application can get ahead of the remote applications. A large delay can cause the processing of the shared application to appear differently on each of the systems. This difference can cause confusion among each of the participants of the collaboratory session.

In one embodiment of the present invention, there is a pacing meter is utilized in a user interface to indicate the magnitude of the delay in the event collaboration system. The event collaboration system can also use the pacing meter system and method of the present invention, to detect slow or inactive connections. For instance, if one of the remote systems suddenly quits responding, the pacing meter would immediately go red warning the leader of a possible networking problem.

The pacing meter system and method of the present invention, employs the use of a new event called an echo event to determine the magnitude of the delay. Echo events are dummy events that are interspersed through the input event stream. They are sent to the remote application just as real input events from the leader system are sent. When the echo events are received by the remote systems, they are immediately echoed back to the leader system. The leader system would then be able to measure the magnitude of the delay within the system. The delay could be measured in a number of ways.

One possible measurement could be a time delta, which is the difference between the time the echo events were sent and the time that the echo events were eventually received would be measured. Another measurement of the magnitude of the delay would involve computing the change in the number of outstanding echo events. If the number of outstanding events was ten and was suddenly changed to 100, one could assume that the remote systems were having difficulty keeping up with the event stream. The pacing meter would then be set to reflect the magnitude of delay.

Event sharing collaboration is accomplished by being able to correlate all window trees in an entire forest of window trees within an application's entire set of windows, and being able to correlate window trees that are dynamically created, changed, and destroyed while the application is running.

The tree is a data structure used to organize the windows within the window mapping process. Windows have parents, siblings, and children. Windows can be organized in terms of window trees, where there can be a treetop, and the top most window is the root.

The forest is a structure that ties together all of the window trees that currently exist within an application. One or more trees represent a forest. There are two forests created for each application that is shared: the foundforest and the lostforest.

The foundforest and lostforest are structures of the forest structure that exist for each shared application. The foundforest contains window trees that have been correlated. In other words, each of the windows within their respective trees in the foundforest have been mapped to their corresponding set of windows that exist in each of the remote application's foundforest. The lostforest contains window trees that have been created by the application, but have not yet been mapped. The forest structure contains the following information: (1) the head or first tree in the forest; (2) the tail or the last tree in the forest; (3) the current number of trees in the forest, which is a dynamic variable that changes as windows and trees come and go during dynamic mapping; and (4) various member functions that are used to add and delete window trees, etc.

Window correlation is the primary mechanism that allows the event sharing collaboration system to operate. The event sharing collaboration system of the present invention is aimed at high-performance collaboration. Device-input events, such as for example, but not limited to, mouse and keyboard inputs, are the events being shared. Input events come in various types that include for example, but are not limited to, mouse movements (MotionNotify in the example of X windows), mouse button presses and releases (ButtonPress and ButtonRelease MotionNotify in the example of X windows), and keyboard presses and releases (KeyPress and KeyRelease MotionNotify in the example of X windows). Events are also associated with windows. For example, when a mouse button is pressed and held down, and then dragged across a window to rotate a part of an assembly, one ButtonPress event and many MotionNotify events are being generated in the X windows system example for the window.

The event sharing collaboration system requires the application that is being shared to—execute on each of the systems that are part of the collaboration session. This is called a multiple application instantiation model, as opposed to a single application instantiation model, which requires only one instantiation of the application to be running.

With multiple instantiations of an application running at the same time, only input events need to be shared between the applications for collaboration to take place. The event sharing system requires significantly less network bandwidth than any other collaboration model. Expensive 2D/3D protocol or frame buffer pixels are not shared. For example, when the user clicks on a GUI icon to rotate a part 90 degrees, the button-press event is sent to the remote systems to be applied to the corresponding icon on the remote application. Since very little data is shared, interactivity during the collaboration session is in most cases unimpeded.

However, in order for the event sharing to work properly, the multiple instantiations of the applications should act as if they were being driven by a single local keyboard and mouse. This functionality can be accomplished if the input events that are associated with a local window are shared to the same corresponding window in each of the remote applications.

In effect, the window correlation system of the present invention is the mechanism that allows it to appear as if the keyboard and mouse are local to each of the remote applications. In reality, window correlation is the process of finding a mapping between a certain set of windows in one application (e.g., a pulldown menu) and the corresponding set of windows that exist in the remote shared application(s).

The window correlation system of the present invention described herein addresses two main processes: static window correlation and dynamic window correlation. The terms "window correlation," "window synchronization," and "window mapping" can all be used interchangeably.

Static window correlation occurs when the user initially picks the application that is to be shared. The windows that currently exist within the application, (i.e., those that have already been created), are considered, for the purposes of event sharing, static windows. These static windows should be correlated with their corresponding set of windows that exist in the remote application(s). This static mapping generally occurs only once, at the beginning of a correlation session, when the user starts the application sharing session by selecting a window. Static window correlation is herein defined in further detail with regard to FIGS. 6A through 6C and 7A through 7C.

Dynamic window correlation refers to the process of correlating windows that are created, remapped, and destroyed while the application is being shared. These windows also should be dynamically correlated with their corresponding set of windows that exist in the remote application(s). The dynamic window correlation process is herein defined in further detail with regard to FIGS. 6D through 6F and 7D through 7H.

The window correlation system of the present invention provides these capabilities on any arbitrary operating system such as, for example, but not limited to, Unix, Windows, HP-UX, Windows NT, Mac OS, and the like, and also provides improved performance over the prior art methodologies of window sharing.

The flow chart of FIGS. 5A through 8B show the architecture, functionality, and operation of a possible implementation of the window correlation system 60 software referenced in FIGS. 5A through 8B. In this regard, each block represents a module, segment, or portion of code, which comprises one or more executable instructions for implementing the specified logical function(s). It should also be noted that in some alternative implementations, the functions noted in the blocks may occur out of the order noted in the figures. For example, two groups of blocks (462–463 and 464–465) shown in succession in FIG. 7D may in fact be executed substantially concurrently or the blocks may sometimes be executed in the reverse order, depending upon the functionality involved, as will be further clarified hereinbelow.

Turning now to the drawings, FIG. 1 is a block diagram illustrating an example of the architecture of the local and remote client/server systems. This exemplar configuration illustrates the flexibility, expandability, and platform independence of the present invention. While the system configuration could take many forms, the diagram of FIG. 1 illustrates a plurality of diverse workstations 3, and 4 connected to a network 8. Additional workstations 5 and 6 may similarly be remotely located and in communication with the network 8 through a dial-in 7 or other connection. Each of the workstations in FIG. 1 is uniquely illustrated to emphasize that user workstations may comprise a diverse hardware platform.

Additional workstations 11 and 12 may similarly be located and in communication with the remote network server 41 for access to data on the local network server 21 and the remote network server 41. Workstations 11 and 12 communicate with the remote network server 41 over a network 13.

Networks 8 and 13 may be, for example but not limited to, dial-in network, LAN, WAN, PSTN, Intranet, Internet and Ethernet type networks, also known as 10 BASE 2, 10 BASE 5, 10 BASEF, 10 BASET, BASE BAN network, and the like. The local network server 21 and workstations 3–6, connected to the local network server 21, communicate with the remote network server 41 and workstations 11 and 12, connected to the remote network server 41, over a network 9. Network 9, may be for example, but not limited to, a LAN, WAN, Ethernet, PSTN, Intranet/Internet communication links, and the like.

Illustrated in FIG. 2 is a block diagram illustrating an example of the high-level architecture and process interaction of the window correlation system 60 of the present invention. The interaction of the window correlation system 60 is between the local X server 100, local application sharing process, referred to herein as "sharedapp process" 200 and local clients 33X processes, and remote X server 600, remote application sharing process referred to herein as "remote sharedapp process" 400 and remote clients processes 53X, as shown in FIG. 2.

The user of keyboard 25 and mouse 24 is said to be driving the session. The user that controls the keyboard and mouse is called the "leader." All other users that are participating in the collaboration session at the remote systems are called "listeners." The keyboard 25 and mouse 24 is attached to the local X server 100, which controls the input events coming from these input devices.

The input is generally directed to a client or application 33X that is being driven by the user through a connection to the local X server 100. Notice that the local client 33X and local X server 100 communicate with each other through the standard X protocol, which is made up of X requests, X replies, and X events and is known to those skilled in the art. The application installation on the left side of the figure is called the local client A process 33X, and the other application instantiation on the right side of the figure that is part of the collaboration session is called the remote client A process 53X.

One example of a sharable client or application is OpenGL. OpenGL is a software interface to graphics hardware. As known in the art, OpenGL's interface consists of about 120 distinct commands, which a user could utilize to specify the objects and operations needed to produce an interactive 3-dimensional display. In this example, client process OpenGL routines are generally designed to be hardware independent interfaces that are implemented on many different hardware platforms.

It is the local sharedapp process 200 and remote sharedapp process 400 that represent the processes that provide the collaboration capabilities. These processes are separate processes, and for the purposes of this disclosure, are called the "window correlation system" 60. The local sharedapp process 200 is on the left side of the figure, and the one on the right is the remote sharedapp process 400. The local sharedapp process 200 is responsible for sharing the real input events to all other remote sharedapp processes 400. Note that the local sharedapp process 200 is responsible for capturing a copy of all input events and relaying them to the remote applications.

A network 9 represents the connection between the local network server 21 (FIG. 1) and remote network server 41 (FIG. 1). The right side of the figure represents the same set of processes described above running on one or more remote systems. The local sharedapp process 200 and remote sharedapp process 400 communicate across network 9 using a sharedapp protocol. The sharedapp protocol allows the local X server 100, through the local sharedapp process 200, to communicate with multiple remote X servers 600 through iterations of multiple remote sharedapp process 400. The communication is two way and there is a set of protocol requests and a set of protocol replies.

Figure 3A:
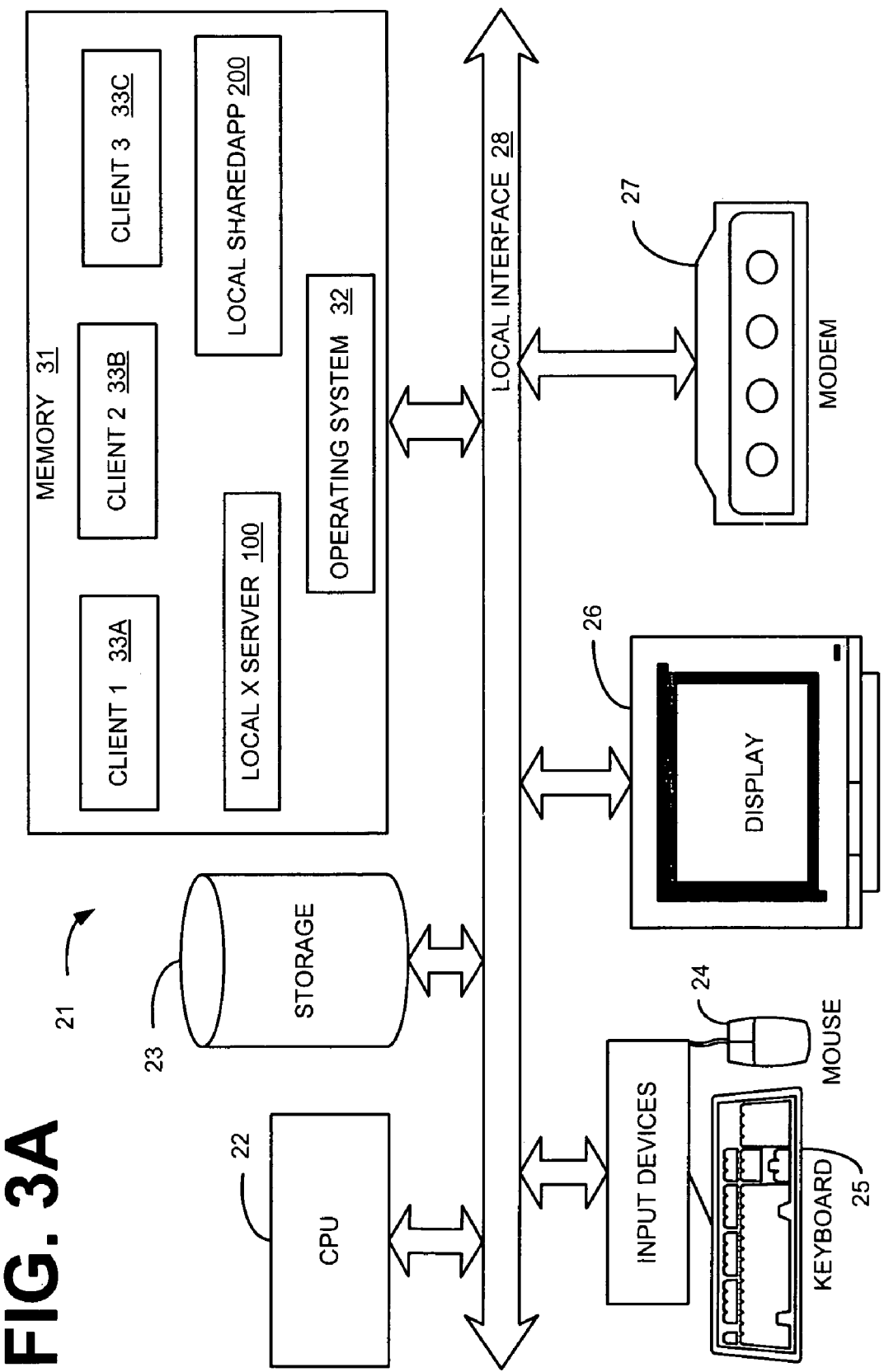
FIG. 3A is a block diagram illustrating an example of a local X server, local shared application and local clients processes of the present invention, situated within a computer readable medium, for example, in a computer system of the local server.

Illustrated in FIG. 3A, is a block diagram illustrating an example of a local network server 21, including a local X server 100, local sharedapp process 200 and local clients 33(A–C) processes, for example, within a computer readable medium, such as memory 31.

Server systems today, such as local network server 21, access and process client applications or resources, required by a local user by using the central processor unit 22, storage device 23, and memory 31 with an operating system 32. The processor accepts data from memory 31 and storage device 23 over a local interface 28 (i.e., a bus). Directions from the local user can be signaled to the local network server 21 by using the input devices such as mouse 24 and keyboard 25. The actions input and result output are displayed on a display device such as, but not limited to terminal 26. The local network server 21 provides access to communication facilities via modem 27 to transport commands from the local user to other resources connected to the network 9.

As discussed above, it is the local X server 100 that controls the input events coming from the input devices and the local clients 33A–33C that include sets of routines used to direct the performance of procedures and/or subroutines required by the user. It is the local sharedapp process 200 that represents the process that provides the collaboration capabilities for the local X server 100 process.

Figure 3B:
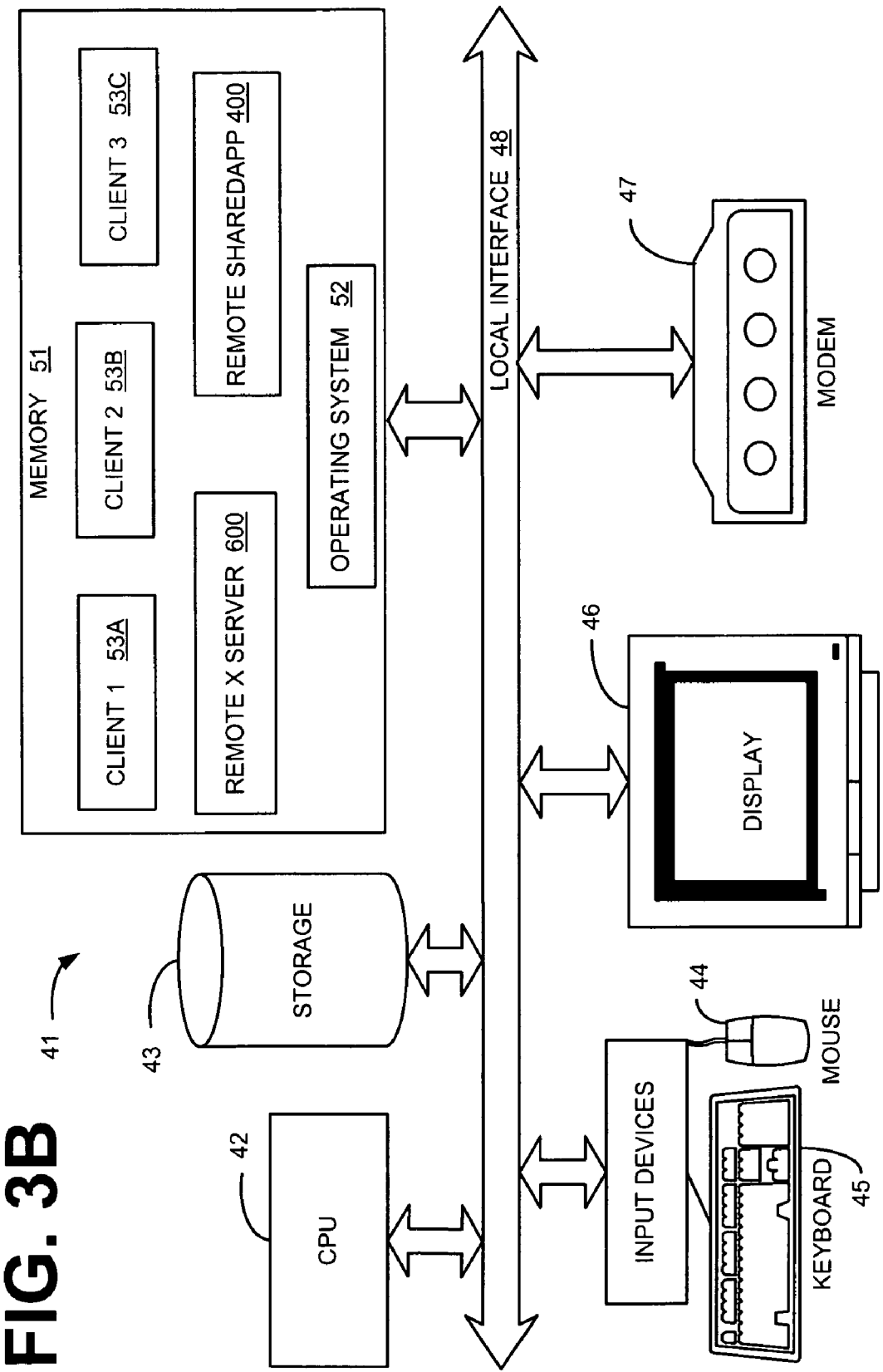
FIG. 3B is a block diagram illustrating an example of a remote X server, remote sharedapp and remote clients processes of the present invention, situated within a computer readable medium, for example, in a computer system of the remote server.

Illustrated in FIG. 3B is a remote server system 41, including a remote X server 600, remote sharedapp process 400 and remote client's 53A–53C processes, for example, within a computer readable medium such as memory 51. The architecture of the remote server system 41 is similar to that of the local network server 21. The functionality of processor 42, storage device 43, mouse 44, keyboard 45, display 46, and modem 47 are essentially the same as corresponding items of FIG. 3A described above.

As discussed above, it is the remote sharedapp process 400 that accepts the incoming events from the local sharedapp process 200, and passes the events to the remote X server 600. These events are processed using the remote clients 53(A–C) processes and are then output to a remote user.

Figure 4:
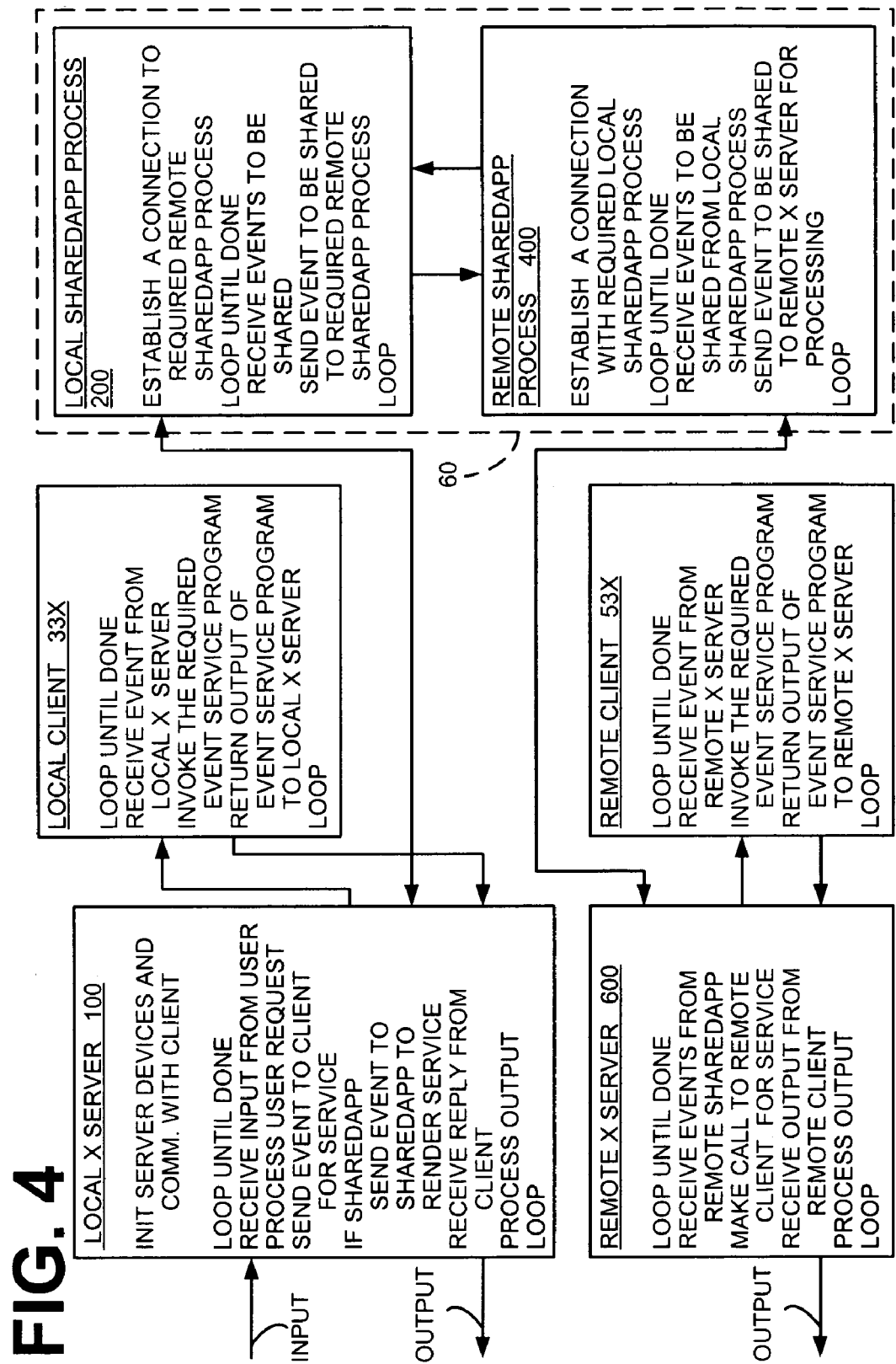
FIG. 4 is a block diagram illustrating in further detail an example of the process interaction between the local X server, local sharedapp and local clients processes, and remote X server, remote sharedapp and remote clients processes, for the events issued by a local user that are intercepted by the local sharedapp for reporting to the remote sharedapp, as shown in FIGS. 2, 3A and 3B.

Illustrated in FIG. 4 is a block diagram illustrating, in further detail, an example of the window correlation system 60 of the present invention. Shown is the interaction of the window correlation system 60 for the events issued by a local user to a local X server, that are intercepted by the local sharedapp process 200 for reporting to the remote sharedapp process 400, as shown in FIG. 2.

As shown, a user can input a command and receive output from a local X server 100. The local X server 100 receives this input from the user and processes the user request. The local X server 100 sends an event to a local client 33X for servicing the user request. If sharedapp functionality is enabled, the local X server 100 also sends the event to the local sharedapp process 200 to render service. The local X server 100 then receives a reply from the client 33X, processes the output, provides the user with the output and loops to receive the next input from the user.

The local client 33X awaits to receive events from a local X server 100 and then invokes the appropriate event service program to service the event. Once the event service program is completed, the local client 33X returns the output of the event service program to the local X server 100 and then awaits the next event from the local X server 100. The window correlation system 60 of the present invention includes two processes. A local sharedapp process 200 and a remote sharedapp process 400. The local and remote sharedapp processes establish and maintain communication with the local X server 100 and a remote X server 600 for sharing windows and processing events. The local sharedapp process 200, upon startup, establishes a connection with the corresponding remote sharedapp process 400. The local sharedapp process 200 then waits to receive events to be shared from the local X server 100. Upon receiving the event from the local X server 100, the local sharedapp process 200 sends the event by unicast or multicast to be shared to each of the required remote sharedapp processes 400. The local sharedapp process 200 then returns and waits to receive the next event to be shared.

The remote shareapp process 400, upon startup, also establishes the connection with the corresponding local sharedapp process 200. Upon establishing the connection, the remote sharedapp process 400 waits to receive events to be shared from the local sharedapp process 200. Upon receiving an event from the local sharedapp process 200, the remote sharedapp process 400 sends the event to be shared to the remote X server 600 for processing. The remote sharedapp process 400 then returns to wait and receive the next event from the local sharedapp process 200.

The remote X server 600 waits to receive events from the remote sharedapp process 400. The remote X server 600 upon receiving an event from the remote sharedapp process 400, makes a call to the remote client 53X for servicing the event. The remote X server 600 then receives output from the remote client 53X and outputs the appropriate data to the remote user.

The remote client 53X waits to receive an event from the remote X server 600. Upon receipt of an event, the remote client 53X invokes the required event service program and returns the output of the event service program to the remote X server 600. After return of the output, the remote client 53X loops and awaits receipt of the next event from the remote X server.

The local and remote X servers 100 and 600, respectively, are herein defined in further detail with regard to FIGS. 5A and 5B, and 8A and 8B, respectively. The local sharedapp process 200 and remote sharedapp process 400 are herein defined in further detail with regard to FIGS. 6A through 6F, and 7A through 7H, respectively.

Illustrated in FIGS. 5A and 5B are flow charts of an example of the local X server 100 in the window correlation system 60 of the present invention. First, the local X server 100 is initialized at step 101. Next, the local clients 33X connect to the local X server 100 at step 102. At step 103, the local X server 100 receives and processes user and client requests. When the local X server 100 receives a request for service from a local user, the local X server 100 sends an event to the local client 33X for processing as previously discussed with regard to FIGS. 3 and 4. Upon completion of the processing of the event, the client 33X returns the event and replies to the local X server 100 at step 104. The local X server 100 also returns any replies or output to the local user at step 104.

At step 105, the local X-server 100 determines if input from the local user indicates the desire for sharing applications. If the input does not indicate the sharing of applications, the local X server 100 returns to repeat steps 103 through 105 above.

However, if the local X server 100 determines at step 105 that the input indicates that sharing of applications is desired, at step 106 the local X server 100 accepts input from the user indicating which applications are to be shared. At step 111, the local X server 100 determines if the applications that the user indicated the desire to share are enabled for sharing. If the applications that the user indicated at step 106 are not enabled for sharing, then the local X server 100 returns to repeat steps 103 through 105.

If the applications that the user indicated to be shared are enabled for sharing, the local X server 100 indicates, at step 112, which applications were selected to be shared with the local sharedapp process 400. The local X server 100 receives a request from the local sharedapp process 400 for the local window tree structures for applications to be shared at step 113. At step 114, the local X server 100 returns the local window tree structures to the local sharedapp process 400.

At step 115, the local X server 100 maintains the local window tree structures with the local sharedapp process 400 while processing shared events. This process is herein defined in further detail with regard to FIG. 5B.

In step 116, the local X server 100 determines if there are any clients left sharing events. If there are clients left sharing events, the local X server 100 returns to repeat steps 103 through 116. If there are no clients left to share events, the local X server 100 exits at step 119.

Illustrated in FIG. 5B is the sharing events process 120 on the local X server 100. At step 121 the sharing events process 0.120 receives and processes the client request. At step 122 the sharing events process 120 returns events and replies to the local client 33X.

At step 123, the sharing events process 120 determines if a shared window has been deleted during the processing of the client request received at step 121. If it is determined at step 123 that no shared window was deleted, the shared events process 120 proceeds to step 125. If it is determined at step 123 that a shared window was deleted during the processing of the client request at step 121, the shared events process 120 deletes the window and sends a delete window event to the local sharedapp process 400 at step 124.

In step 125, the sharing events process 120 determines if a new shared window has been created. If a new shared window has not been created the sharing events process 120 skips to step 127, to determine ifthere was a device-input event. If the sharing events process 120 determines that a new shared window was created during the processing of the client request at step 121, the sharing events process 120 creates the appropriate window structure and sends a create window event to the local sharedapp process 400 at step 126.

At step 127, the sharing events process 120 determines if a device-input event was processed at step 121. If a device-input event was not processed at step 121, then the sharing events process 120 skips to step 132 to make a determination if the sharing events process 120 is done sharing events. If the sharing events process 120 determines that the client request input at step 121 was a device-input event, then the sharing events process 120 sends a device-input event to the local sharedapp process 400 at step 131.

At step 132, the sharing events process 120 then determines if the sharing events process 120 is done sharing events. If the sharing events process 120 is not done sharing events, the sharing events process 120 loops back to repeat steps 121 through 132. If the sharing events process 120 is done sharing events, the sharing events process 120 exits the sharing events process 120 on the local X server 100 at step 139.

Figure 6A:
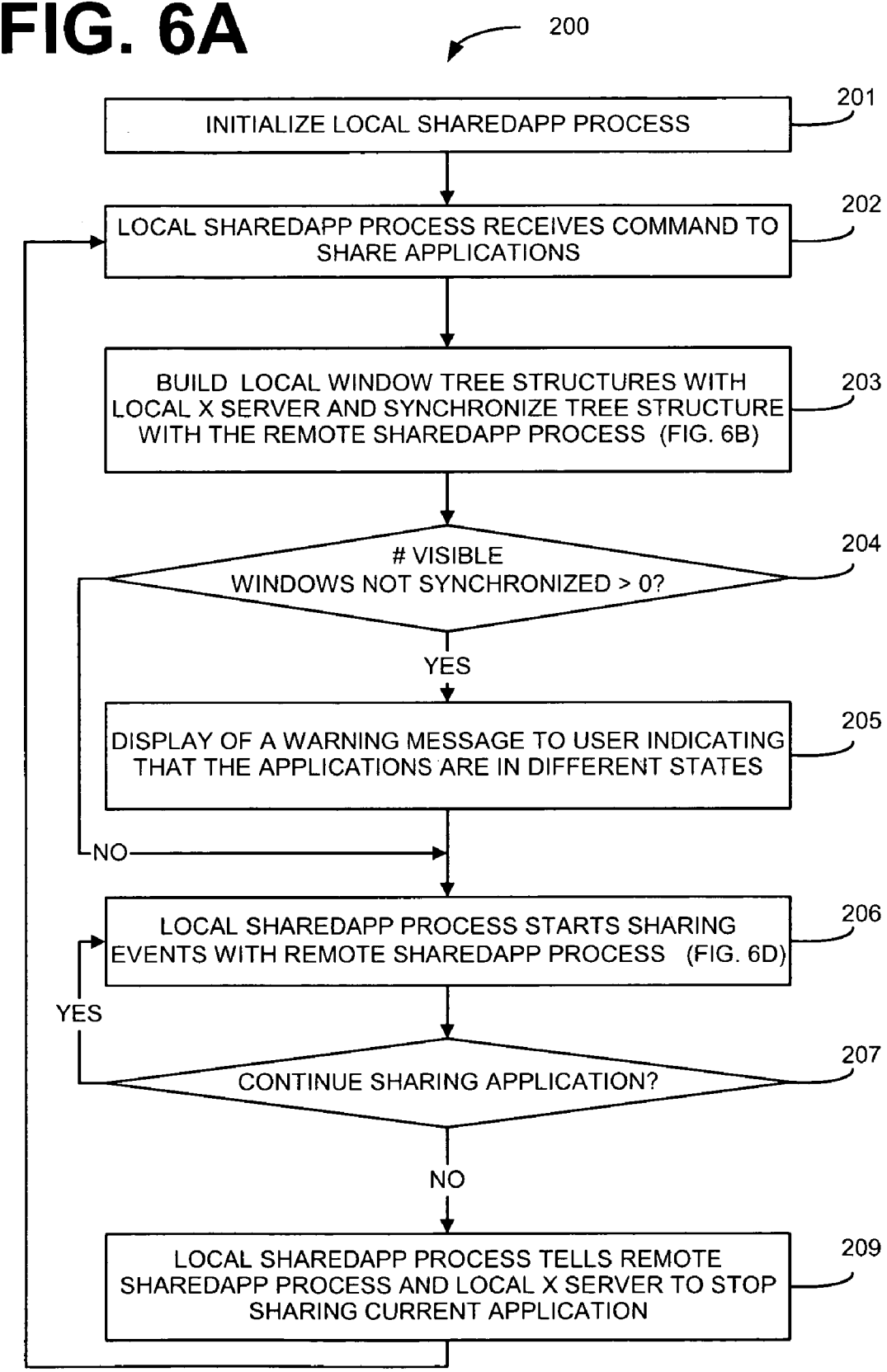
FIG. 6A is a flow chart of an example of the local sharedapp process in the window correlation system of the present invention, as shown in FIGS. 1, 2, 3A and 4.

Illustrated in FIG. 6A is a flow chart of an example of the local sharedapp process 200 in the window correlation system 60 of the present invention. The local sharedapp process 200 is first initialized at step 201. The local sharedapp process 200 then waits to receive a command from the local X server 100 to share applications at step 202. The local sharedapp process 200 builds the local window tree structures with the local X server 100, and synchronizes these tree structures with the remote sharedapp process 400. This building and synchronization of tree structures occurs at step 203 and is herein defined in further detail with regard to FIG. 6B.

The local sharedapp process 200 next determines if the number of visible windows not synchronized is greater than zero at step 204. If there are no visible windows that were not synchronized at step 203, then the local sharedapp process 200 skips to step 206. If it was determined at step 204 that the number of visible windows not synchronized was greater than zero, at step 205 the local sharedapp process 200 displays a warning message to the local and/or remote user(s) indicating the local and remote window trees for the shared applications are in different states.

At step 206, the local sharedapp process 200 starts sharing events with the remote sharedapp process 400. This dynamic sharing of events is herein defined in further detail with regard to FIG. 6D. The local sharedapp process 200 periodically determines if it is desirable to continue sharing applications at step 207. If it is determined that it is desirable to continue sharing applications, the local sharedapp process returns to repeat steps 206 and 207. If it is determined at step 207 that the local sharedapp process 200 should not continue the application sharing, the local sharedapp process 200 informs the remote sharedapp process 400 and the local X server 100 to stop sharing the current application at step 209. The local sharedapp process 200 then returns and waits to receive a share applications command from the local X server 100 at step 202.

Illustrated in FIG. 6B is a flow chart of an example of the build local window tree structure process 220 in the local sharedapp process 200 of the present invention, referenced in FIG. 6A.

With regard to FIG. 6B, the build and synchronize window tree structures process 220 requests the current state of window trees for windows to be shared from the local X server 100, at step 221. The build and synchronize window tree structures process 220 receives the current state of the window trees from the local X server 100 at step 222. At step 223, the build and synchronize window tree structure process 220 identifies all the top-level application windows. At step 224, the build and synchronize window tree structure process 220 instructs the local X server 100 to create an input-only window for each top level application window.

Next, at step 225, the build and synchronize window tree structure process 220 instructs the local X server 100 to reparent (i.e., place) the input-only window on top of the top-level application windows. This is done so that any user input directed towards this shared application will now be intercepted by the input-only window. At step 226, the build and synchronize window tree structure process 220 instructs the remote sharedapp process 400 to locate the remote shared application on the remote X server 600.

Next, at step 227, the build and synchronize window tree structure process 220 performs a static synchronization of tree structures for windows and applications in the local shareapp process 200 and the remote shareapp process 400. The static synchronization of tree structures process 240 is herein defined in further detail with regard to FIG. 6C.

Next, at step 228 in FIG. 6B, the build and synchronize window tree structure process 220 sends an event to the local X server 100, instructing the local X server 100 to unmap the input-only window over each top level application window created and reparented above at steps 224 and 225. The build and synchronize window tree structures process then exits at step 229.

Figure 6C:
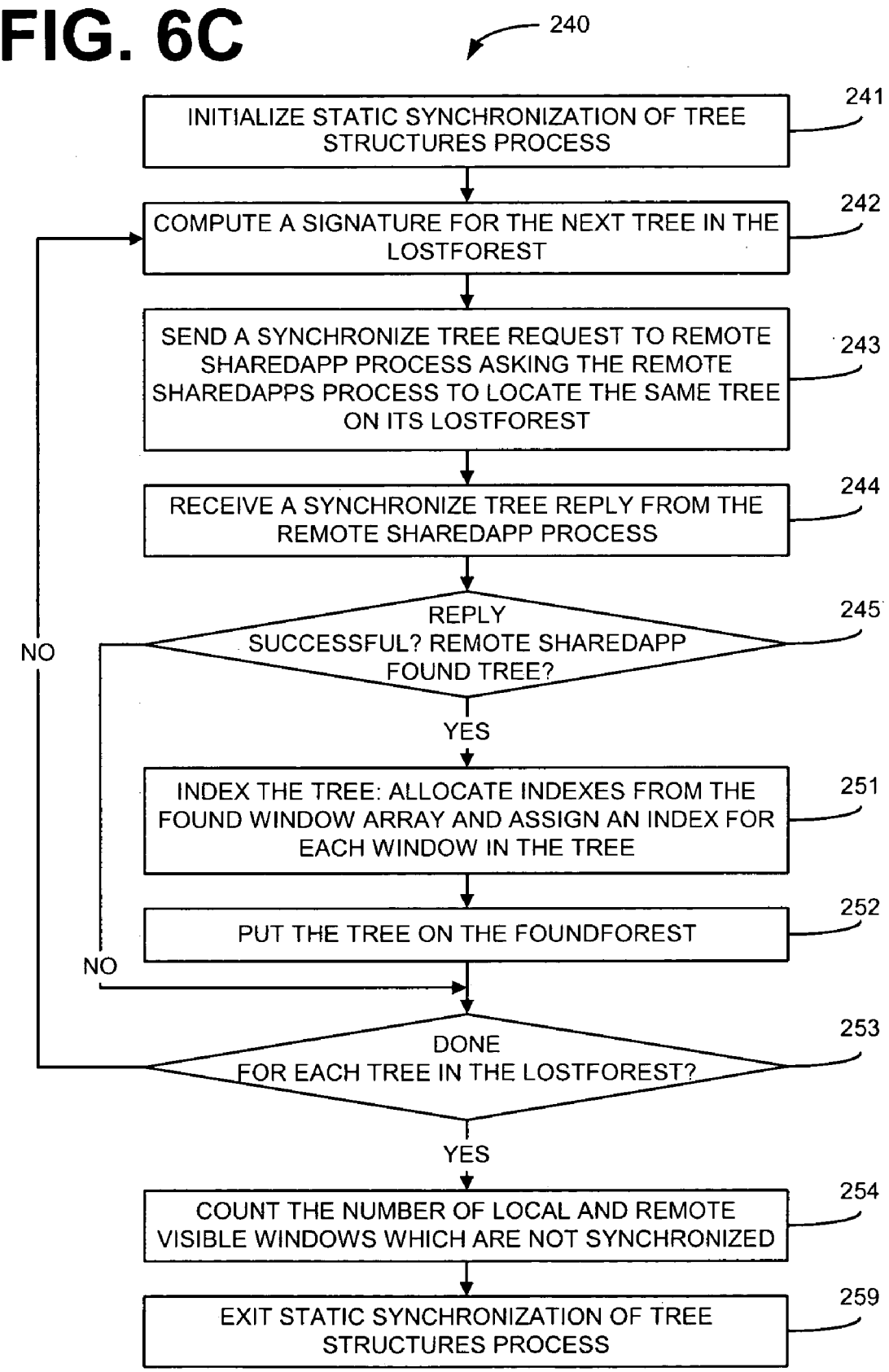
FIG. 6C is a flow chart of an example of the window tree structure static synchronization process in the local sharedapp process in the window correlation system of the present invention, as shown in FIG. 6B.

Illustrated in FIG. 6C is a flow chart of an example of the static synchronization of tree structures process 240 in the local sharedapp process 200, referenced in FIG. 6B.

Referring to FIG. 6C, static synchronization of tree structures process 240 is initialized at step 241. At step 242, the static synchronization of tree structures process 240 computes a signature for the first or next tree in the lostforest. The forest class is a class that ties together all of the window trees that currently exist within the application being shared. One or more trees represent a forest. There are two forests created for each application that is shared: the foundforest and the lostforest.

The foundforest and lostforest are objects of the forest class that exist for each shared application. The foundforest contains window trees that have been correlated. In other words, each of the windows within their respective trees on the foundforest have been mapped with their corresponding set of windows that exist in each of the remote applications. The lostforest contains window trees that have been created by the application, but have not yet been mapped. These two objects, the foundforest and the lostforest, are two very important and heavily used window-mapping objects. The forest class contains, for example, but is not limited to, the following information: (1) the head or first tree in the forest; (2) the tail or the last tree in the forest; and (3) the current number of trees in the forest. The current number of trees in the forest is a dynamic variable and changes as windows and trees come and go during dynamic mapping.

The signature computed at step 242 represents the "shape" of the window tree. The signature is used by the remote sharedapp process 400 to determine if there are window trees that match the window trees sent by the local sharedapp process 200. The signature gives the remote.

10. sharedapp process 400 the ability to determine if two trees are identical. A tree signature is used to uniquely and quickly identify one tree from another. If the signature is too generic, multiple trees could potentially match the same signature. The design and computing of the signature is a very important part of window correlation.

A number of characteristics can be used to build a unique tree signature. The following list describes current examples that could be part of the tree signature:

(1) Tree CRC: The tree CRC is a number or data structure that encapsulates the unique characteristics of the tree. The CRC could be as simple or as complex as necessary. A simple CRC might contain just the number of windows in the tree. A more complex CRC might encode the "shape" of the tree. This would possibly contain the depth and breadth of the tree, the parent/child/sibling relationship within the tree, etc.

(2) Window properties: Other information that might go into the tree signature could be window properties. The WM-NAME property is usually a unique name assigned to each top level window. Another useful property is the MIT OBJ CLASS property. This property contains the widget class and object name of each window in the tree associated with a widget. This property is only in effect when the "*XtDebug: True" resource is set prior to application startup.

(3) Bitmap CRC for various windows within the tree: This could be used to help differentiate between multiple trees that have the same "shape." For example, consider two very similar sets of pull-down menus. Menu 1 contained 3 pickable items, each with the text of pickme 1, pickme 2, and pickme 3. Menu 2 contained 3 items with the text of pickme A, pickme B and pickme C. Each menu has the same number of child windows, so the structure of the trees was very similar to each other. A simple signature would not be able to determine which menu should be correlated. But, if the CRC of each child window were kept, the different text in each item would force a unique CRC, which would enable a unique signature to be computed. Another example of the CRC generation uses the different default fonts between the various remote systems within the various shared applications, causing the same menus to generate different CRCs.

(4) Viewability state of the top-level window in the tree.

(5) Bounding box of the tree.

Also, the signatures developed on Unix might be different than those developed on the Microsoft Windows or other operating system.

Next, at step 243, the static synchronization of tree structures process 240 sends a synchronized tree request to the remote sharedapp process 400 asking the remote sharedapp process 400 to locate the same tree on its lostforest. The static synchronization of tree structures process 240 receives a synchronized tree reply from the remote sharedapp process 400 at step 244.

At step 245, the static synchronization of tree structures process 240 determines if the reply received at step 244 was successful and that the remote sharedapp process 400 found the corresponding tree. If the reply was not successful, the static synchronization of tree structures process 240 skips to step 253 to proceed with the next tree in the lostforest. If the reply was successful and indicates that the remote sharedapp process 400 found the corresponding tree, the static synchronization of tree structures process 240 indexes the tree, allocates indexes from the found window array and assigns an index for each window in the tree at step 251. The indexed tree is then placed on the foundforest list at step 252.

At step 253, the static synchronization of tree structures process 240 determines whether synchronization of every tree in the lostforest has been attempted. If the static synchronization of tree structures process 240 has not attempted to synchronize each tree in the lostforest the static synchronization of tree structures process 240 returns to repeat steps 242 through 253.

If, at step 253, the static synchronization of tree structures process 240 has attempted to synchronize every tree in the lostforest, then the static synchronization of tree structures process 240 proceeds to step 254 and counts the number of local and remote visible windows which were not synchronized. This number of local and remote visible windows which were not synchronized is utilized at step 204 (FIG. 6A) to determine if a warning message should be displayed to the user indicating that the applications are in different states. The static synchronization of tree structures process 240 then exits at step 259.

Figure 6D:
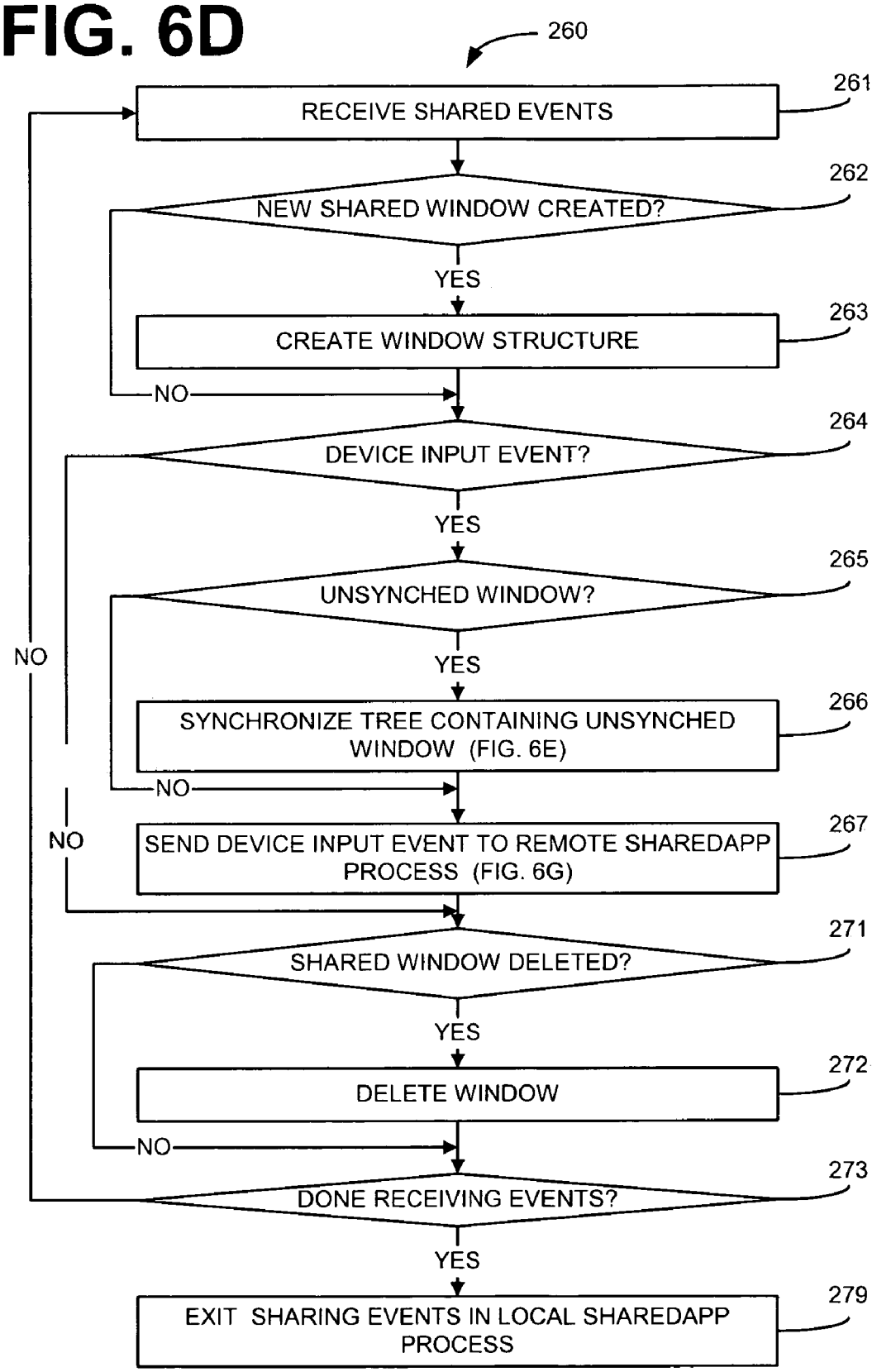
FIG. 6D is a flow chart of an example of the share events process in the local sharedapp process in the window correlation system of the present invention, as shown in FIG. 6A.

Illustrated in FIG. 6D is a flow chart of an example of the share events process 260 in the local sharedapp process 200, referenced in FIG. 6A.

With respect to FIG. 6D, the sharing events process 260 receives shared events from the local X server 100 at step 261. At step 262, the sharing events process 260 determines if a new shared window was created when the local X sever 100 processed the shared event. If the sharing events process 260 determined that a new shared window was not created with the event received from the local X server 100, the sharing events process 260 skips to step 264. If the sharing events process 260 determined that a new shared window was created from the event received from the local X server 100 at step 261, the sharing events process 260 creates a window structure for the new shared window at step 263.

At step 264, the sharing events process 260 determines if the received shared event is a device-input event. If the event received at step 261 is not a device-input event, the sharing events process 260 skips to step 271. If it is determined that the event received at 261 is a device-input event, the sharing events process 260 then determines if the event is to be performed with an unsynchronized window at step 265.

If the event is not to be performed with an unsynchronized window, the sharing events process 260 skips to step 267 for continued processing. If it is determined that the event received at step 261 is to be performed with an unsynchronized window, the sharing events process 260 proceeds to synchronize the tree containing the unsynchronized window at step 266. The dynamic synchronization of an unsynchronized window tree structure process 300 is herein defined in further detail with regard to FIG. 6F.

Still referring to FIG. 6D, at step 267, the sharing events process 260 sends the device-input event to the remote sharedapp process 400. The sending of the device-input event to the remote sharedapp process 400 is herein defined in further detail with regard to FIG. 6G.

While still referring to FIG. 6D at step 271, the sharing events process 260 determines if a shared window was deleted when the local X sever 100 processed the shared event. If a shared window was not deleted, then the sharing events process 260 proceeds to step 273 to determine if processing of shared events is complete. If the sharing events process 260 determines at step 271 that a shared window was deleted, then the sharing events process 260 deletes the window at step 272 and proceeds to step 273.

At step 273, it is next determined whether the sharing events process 260 is finished receiving shared events. If the sharing events process 260 is not finished sharing events, then the sharing events process 260 returns to repeat steps 261 through 273. If it is determined that the sharing events process 260 is finished receiving events at step 273, then the sharing events process 260 then exits at step 279.

Figure 6E:
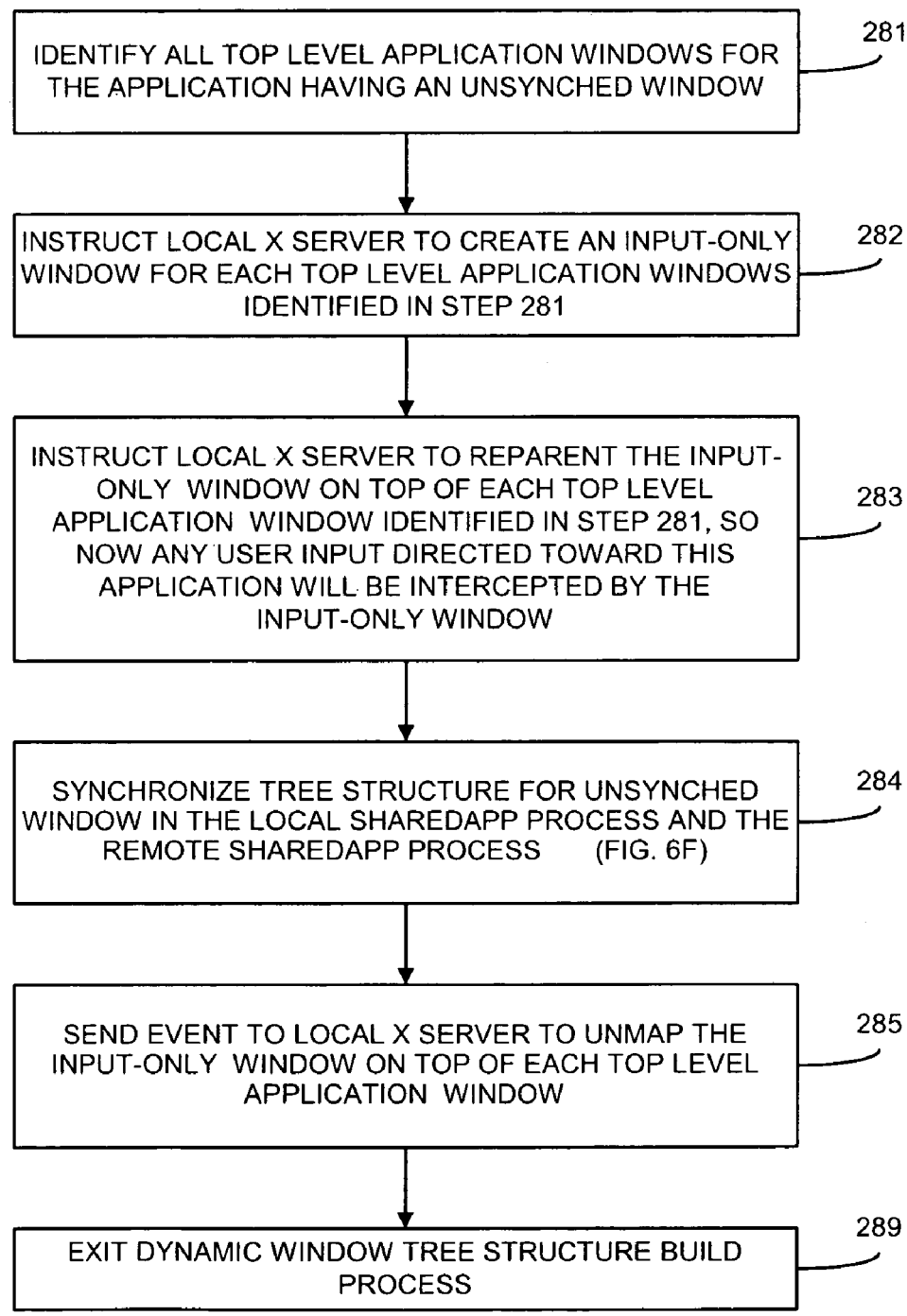
FIG. 6E is a flow chart of an example of dynamic window tree structure build process for an unsynchronized window in the local sharedapp process in the window correlation system of the present invention, as shown in FIG. 6D.

Illustrated in FIG. 6E is a flow chart of an example of the dynamic window tree structure build process 280 for an unsynchronized window in the local sharedapp process 200, referenced in FIG. 6D.

With respect to FIG. 6E, the dynamic window tree structure build process 280 for an unsynchronized window first identifies, at step 281, all the top-level application windows for the application having the unsynchronized window. At step 282, the dynamic window tree structure build process 280 instructs the local X server 100 to create an input-only window for each top-level application window identified in step 281. At step 283, the dynamic window tree structure build process 280 instructs the local X server 100 to reparent the input-only window on top of each top-level application window identified in step 281. This is done so that any user input directed toward this application will be intercepted and rejected by the input-only window.

At step 284, the dynamic window tree structure build process 280 attempts to synchronize the tree structure for the unsynchronized window in both the local sharedapp process 200 and in the remote sharedapp process 400. The dynamic synchronization of an unsynchronized window tree structure process 300 is herein defined in further detail with regard to FIG. 6F.

Next, at step 285 in FIG. 6E, the dynamic window tree structure build process 280 containing the unsynchronized window sends an event to the local X server 100 to unmap (i.e., terminate) the input-only window on each top level application window. The dynamic window tree structure build process 280 for an unsynchronized window then exits at step 289.

Figure 6F:
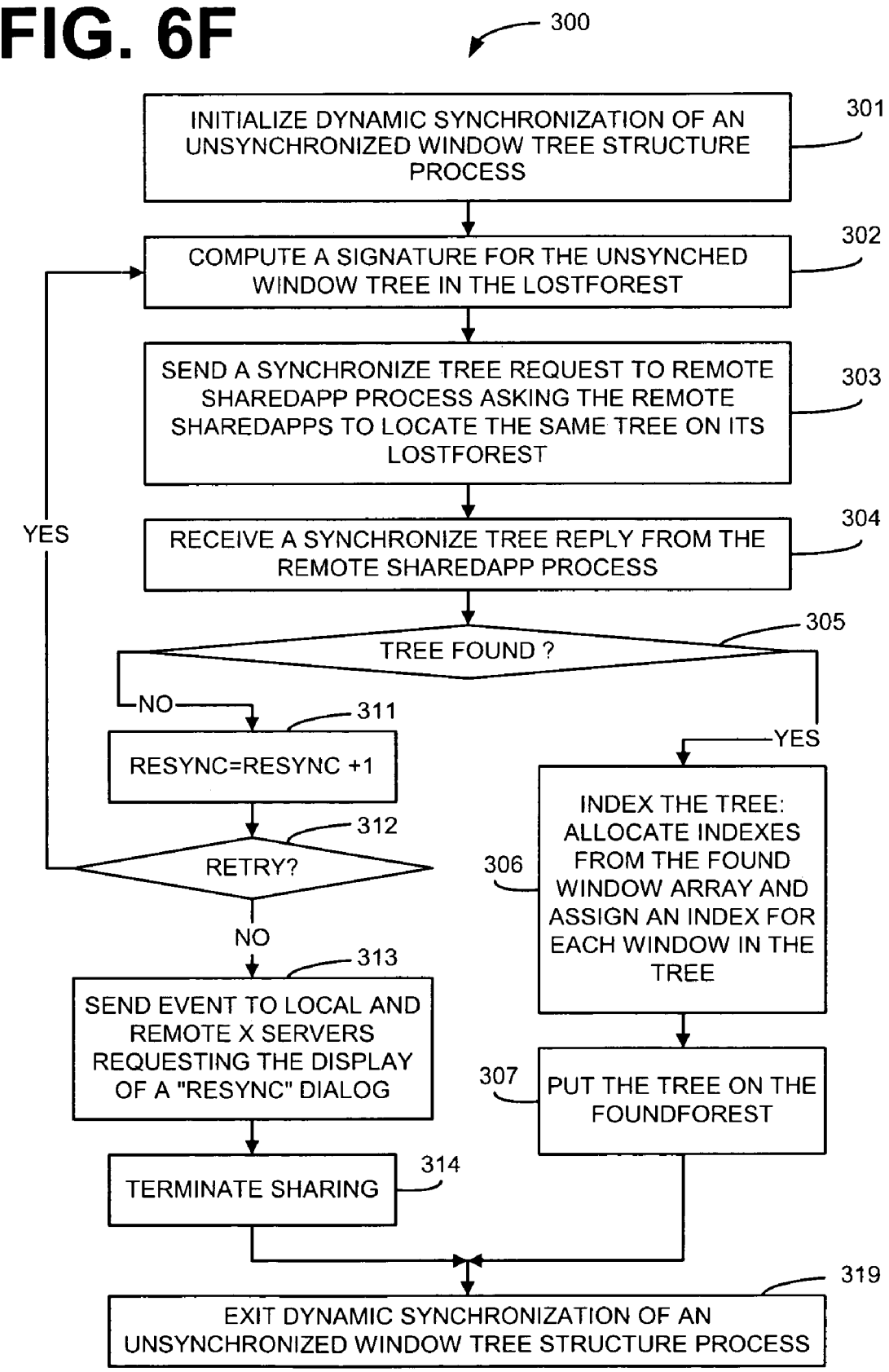
FIG. 6F is a flow chart of an example of the dynamic synchronization of an unsynchronized window tree structure process in the local sharedapp process in the window correlation system of the present invention, as shown in FIG. 6E.

Illustrated in FIG. 6F is a flow chart of an example of the dynamic synchronization of an unsynchronized window tree structure process 300 in the local sharedapp process 200, as shown in FIG. 6E. In FIG. 6F, the dynamic synchronization of an unsynchronized window tree structure process 300 is first initialized at step 301. The dynamic synchronization of an unsynchronized window tree structure process 300 computes a signature for the unsynchronized window tree in the lostforest at step 302. As stated above, the signature represents the "shape" of the window tree.

At step 303, the dynamic synchronization of an unsynchronized window tree structure process 300 sends a synchronized tree request to the remote sharedapp process 400 asking the remote sharedapp process 400 to locate the same tree on its lostforest. At step 304, the dynamic synchronization of an unsynchronized window tree structure process 300 receives a synchronized tree reply from the remote sharedapp process 400.

At step 305, the dynamic synchronization of an unsynchronized window tree structure process 300 determines if the unsynchronized window tree in the lostforest was found by the remote sharedapp process 400. If the remote sharedapp process 400 did not find the same tree in its lostforest, the dynamic synchronization of an unsynchronized window tree structure process 300 then increments the resynchronize counter by 1 at step 311. At step 312, the dynamic synchronization of an unsynchronized window tree structure process 300 determines if it is to retry the synchronization of the unsynchronized window tree. If the dynamic synchronization of an unsynchronized window tree structure process 300 is to retry the synchronization of an unsynchronized window, then the dynamic synchronization of an unsynchronized window tree structure process 300 returns to repeat steps 302 through 305.

If the dynamic synchronization of an unsynchronized window tree structure process 300 determines that a retry is not to be performed, then at step 313, an event is sent to the local X server 100 and the remote X server 600 requesting the display of a resynchronize dialog. The local sharedapp process 200 next terminates the sharing of the current application at step 314 and exits the dynamic synchronization of an unsynchronized window tree structure process 300 at step 319.

If, at step 305, the remote sharedapp process 400 determines that the same tree is found on the remote sharedapp process 400 lostforest, then the dynamic synchronization of an unsynchronized window tree structure process 300 indexes the tree and allocates an index from the found window array. The dynamic synchronization of an unsynchronized window tree structure process 300 also assigns an index for each window in the tree at step 306. At step 307, the tree is then put on the foundforest and the dynamic synchronization of an unsynchronized window tree structure process 300 exits at step 319.

Figure 6G:
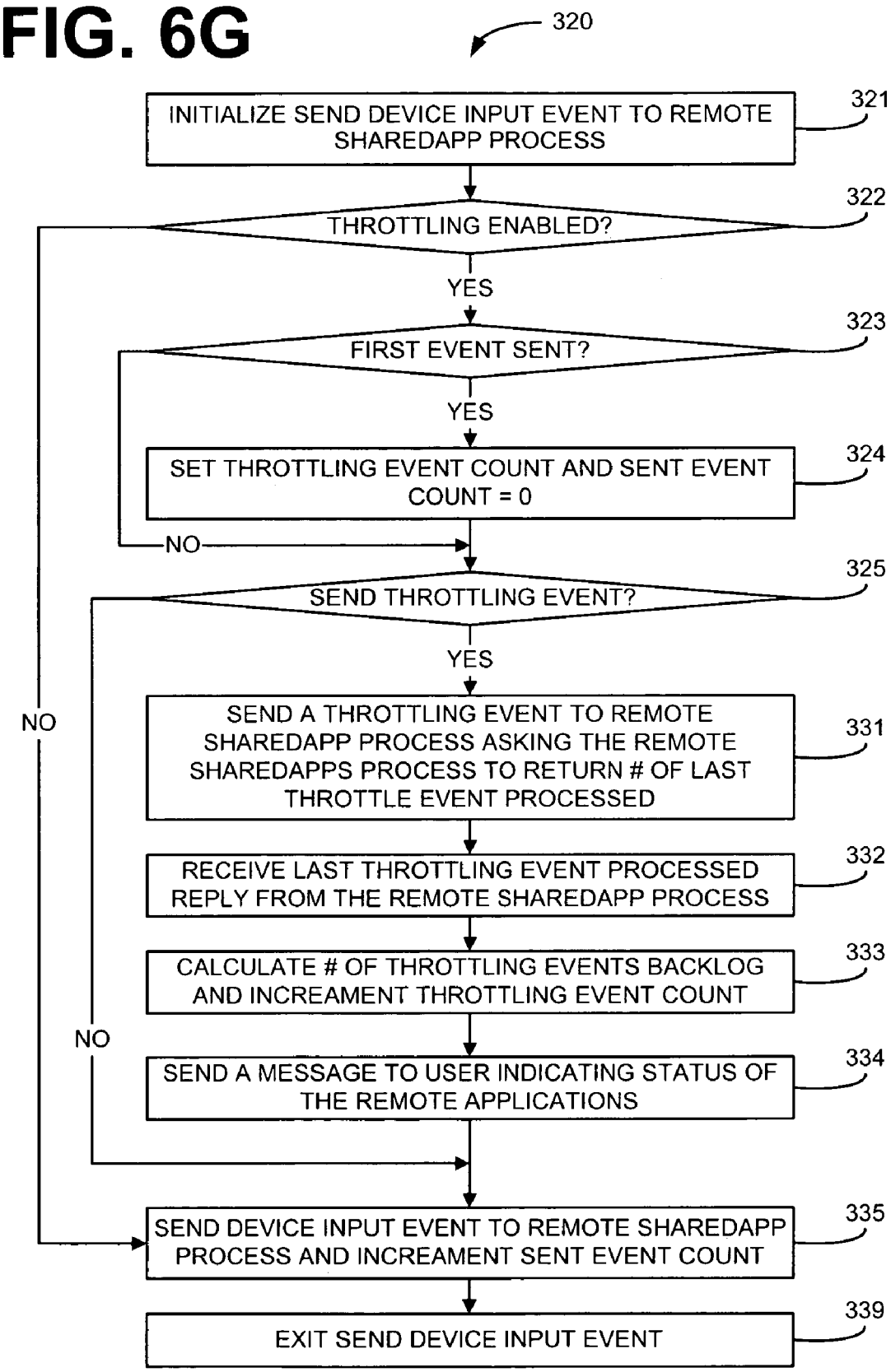
FIG. 6G is a flow chart of an example of the send device-input event process in the local sharedapp process in the window correlation system of the present invention, as shown in FIG. 6D.

Illustrated in FIG. 6G is a flow chart of an example of the send device-input event process 320 in the local sharedapp process 200, referenced in FIG. 6D. The send device-input event process 320 includes the system and method for pacing event-sharing collaboration across multiple distributed applications of the present invention.

Referring to FIG. 6G, first, the initialize send device-input event process 320 is initialized at 321. At step 322, the send device-input process 320 determines whether throttling (i.e., pacing) of events is enabled. If the throttling of events is not enabled, the send device-input event process 320 skips to step 335 and sends the device-input event to the remote sharedapp process 400.

If, however, it is determined at step 322 that throttling of events is enabled, the send device-input event process 320 next determines, at step 323, whether this is the first time an event has been sent to the remote sharedapp process 400. If it is determined that this is not the first event sent to the remote sharedapp process 400, the send device-input event 320 skips to step 325. If it is determined at step 323 that this is the first event sent to the remote sharedapp process, then the send device-input event 320 sets the throttling event count and sent event count to zero (0) at step 324.

At step 325, the send device-input event process 320 determines if a throttling event is to be sent. Throttling events are interspersed at user predetermined intervals throughout the input event stream. Throttling events are sent to the remote sharedapp process 400 just as real input events are sent. Throttling events can be sent by, for example but not limited to, interspersing a throttling event after a predetermined number of input device events are sent or after a predetermined elapsed time period. Once the throttling events are received by the remote sharedapp process 400, throttling events are sent to the remote X server 600. The remote X server 600 then sends a reply to the throttling event back to the remote sharedapp process 400 that is then forwarded to the send device-input event process 320 in the local sharedapp process 200.

The send device-input event 320 receives the last throttling event process reply from the remote sharedapp process 600 at step 332. The send device-input event 320 calculates the number of throttling events backlogged and increments the throttling event count at step 333.

At step 334, the send device-input event 320 sends a message to the user indicating the status of the remote applications. In the preferred embodiment, this message is in the form of a pacing meter indicator. The pacing meter is a user interface that will appear green for small delays. The pacing meter turns from shades of green to yellow or red, as the delay of processing the events in the remote X server increases. In an alternative embodiment, the message to the user indicating the status of the remote applications could be a simple status message or other meter display to the user. The pacing meter can also be used to detect slow or inactive connections to a remote system. In this alternative embodiment, if one of the remote systems suddenly stops responding, the pacing meter would immediately go red, thereby warning the user of a possible network problem.

At step 335, the send device-input event 320 sends the device-input event to the remote sharedapp process 400 and increments the sent event count. The send device-input event then exits at step 339.

In an alternative embodiment for calculating the event delay, the send device-input event 320 could utilize an event elapsed time period, instead of the change in the number of outstanding throttling events, to determine the event backlog. In the alternative embodiment, a throttling event is sent from the send device-input event 320 to the remote sharedapp process 400 for forwarding to the remote X server 600. The remote X server 600 replies to the remote sharedapp process 400 and that reply is sent back to the send device-input event 320. The send device-input event 320 is then able to calculate the magnitude of the delay in the processing of events by the remote X server process 600. Calculating the time delta between the time the throttling event was sent and the time that the reply to the throttling event was received determines the magnitude of the delay.

Illustrated in FIG. 7A is a flow chart of an example of the remote sharedapp process 400 in the window correlation system 60 of the present invention, as shown in FIGS. 1, 2, 3A and 4.

First, in FIG. 7A, the remote sharedapp process 400 is initialized as step 401. At step 402, the remote sharedapp process 400 receives a request from the local sharedapp process 200 to locate a remote application to be shared. This request from the local sharedapp process 200 is performed at step 243 (FIG. 6C). At step 403, the remote sharedapp process 400 requests the current state of the window tree from the remote X server 600. The remote sharedapp process 400 receives the current state of the window tree from the remote X server 600 at step 404.

At step 405, the remote sharedapp process 400 determines if there is more than one shared application located. If there is not more than one shared application, the remote sharedapp process 400 proceeds to step 412. If it is determined at step 405 that there is more than one shared application located, then the remote sharedapp process 400 requests that the remote user indicate which remote client application is to be shared at step 411. This request for selection of the proper remote client application to be shared can be accomplished a number of different ways including, for example but not limited to, sending a message event to the remote X server 600 for display to the remote user.

At step 412, the remote sharedapp process 400 builds the remote window tree structure with the remote X server process 600 and proceeds to synchronize the tree structures in the remote sharedapp process 400 and the local sharedapp process 200. The building and synchronization of the window tree structures processes are herein defined in further detail with regard to FIGS. 7B and 7C, respectively.

At step 413, the remote sharedapp process starts sharing events with the local sharedapp process 200. The sharing events process is herein defined in further detail with regard to FIG. 7D.

Still referring to FIG. 7A, at step 414, the remote sharedapp process 400 determines if application sharing is to be continued. If it is determined that application sharing is to be continued, the remote sharedapp process 400 returns to repeat steps 413 through 414. If it is determined that the remote sharedapp process 400 is not to continue sharing the current application, the remote sharedapp process 400 returns to repeat steps 402 through 414.

Figure 7B:
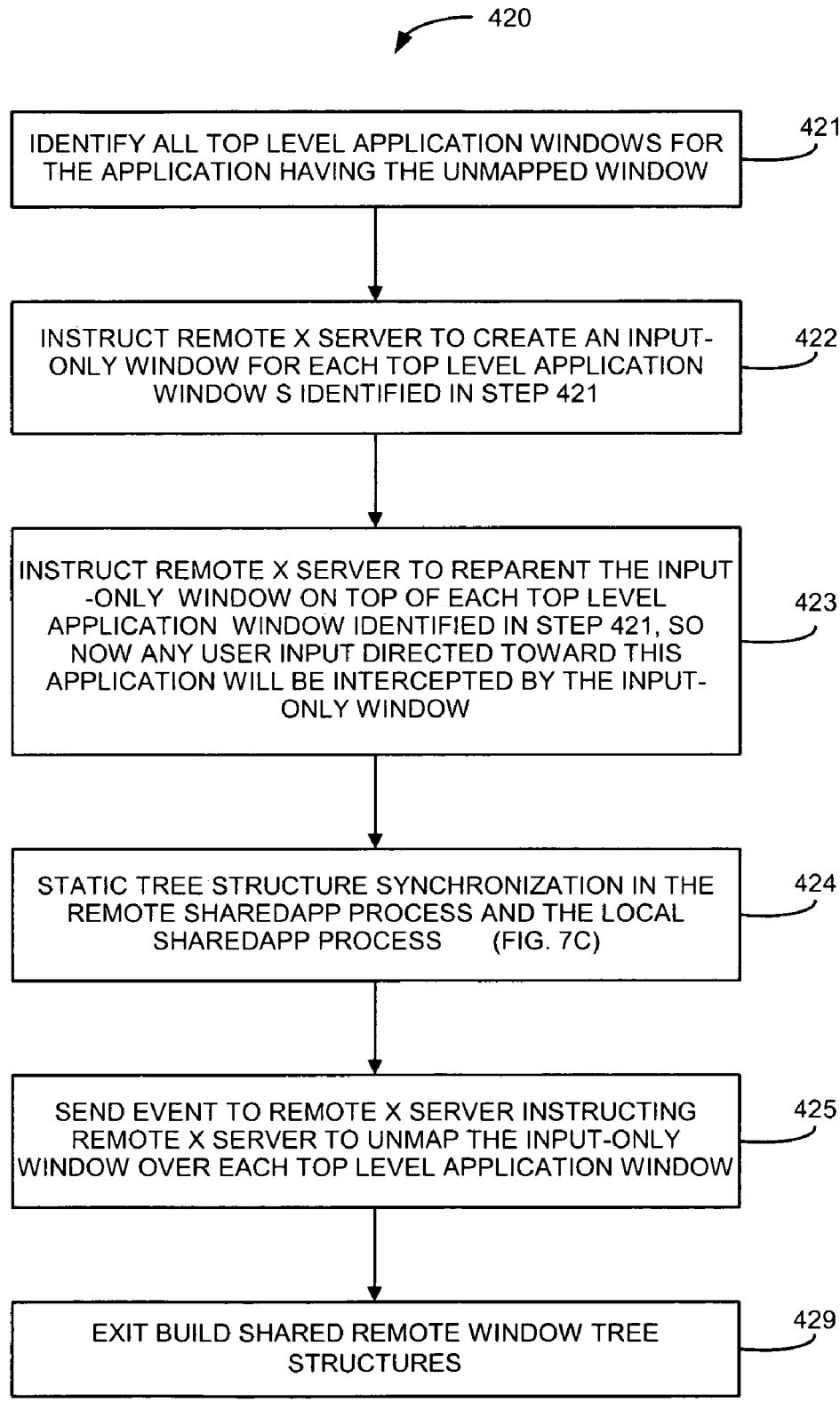
FIG. 7B is a flow chart of an example of the window tree structure build process in the remote sharedapp process in the window correlation system of the present invention, as shown in FIG. 7A.

Illustrated in FIG. 7B is a flow chart of an example of the build remote window tree structure process 420 in the remote sharedapp process 400.

Referring to FIG. 7B, first, the build remote window tree structure process 420 disables the remote user input. At step 421, the build remote window tree structure process 420 identifies all the top level application windows for the application having the unmapped window. At step 422, the remote X server 600 is instructed to create an input-only window for each of the top level to application windows identified in step 421. At step 423, the remote X server 600 is instructed to reparent the input-only window on top of each top level application window identified in step 421, so that any user input directed toward this application will be intercepted by the input-only window.

The build remote window tree structure process 420 then synchronizes the tree structures in the remote sharedapp process and the local sharedapp process at step 424. The synchronization of the tree structures in the remote sharedapp process 400 with the local sharedapp process 200 is herein defined in further detail with regard to FIG. 7C.

At step 425 in FIG. 7B, the build remote window tree structure process 420 sends an event to remote X server 600. The event instructs the remote X server 600 to unmap (i.e., terminate), the input-only window over each top level application window established by the disabled remote user input process performed in steps 421–423. The build shared remote window tree structure process 420 then exits at step 429.

Figure 7C:
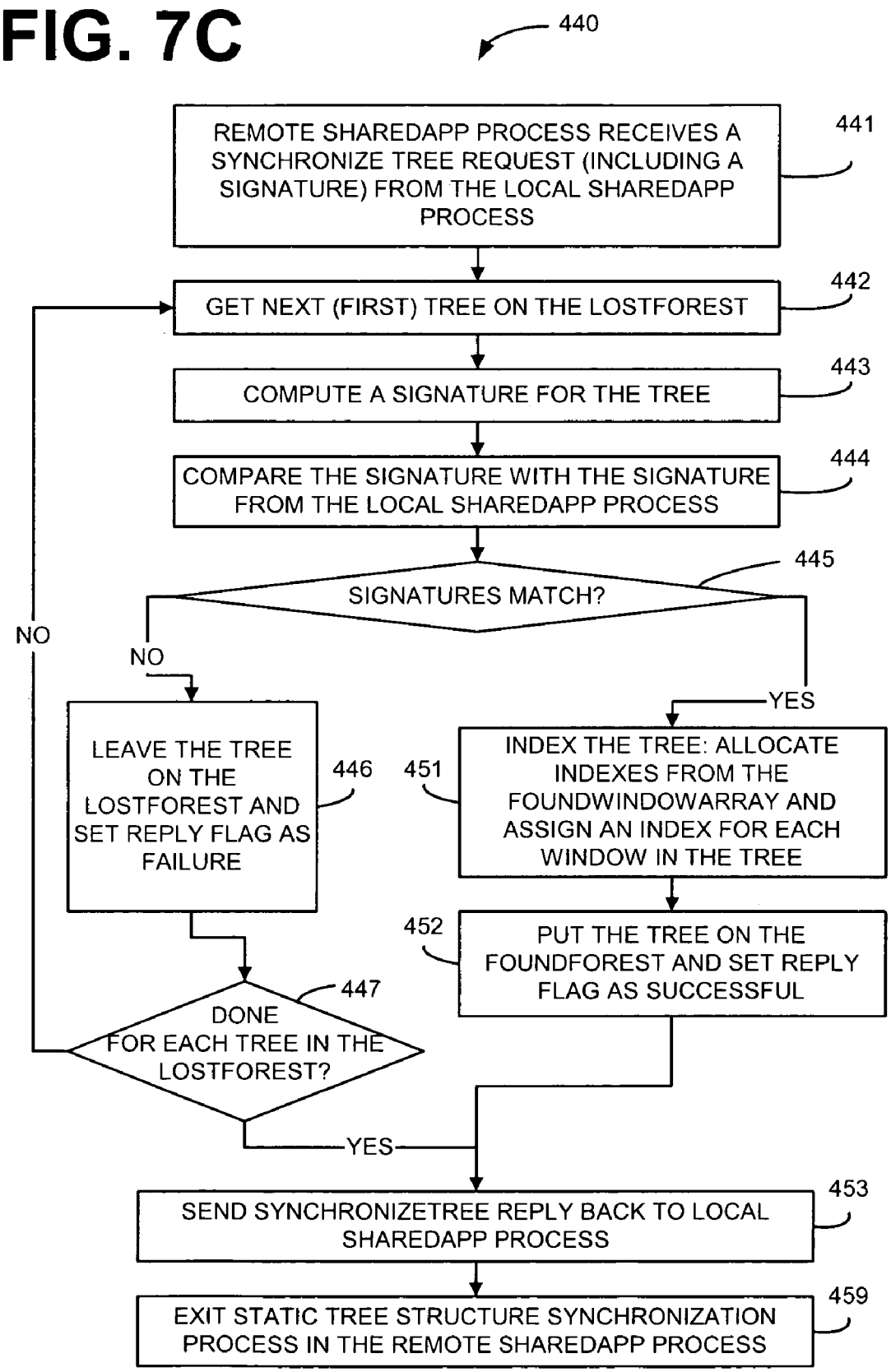
FIG. 7C is a flow chart of an example of the window tree structure static synchronization process in the remote sharedapp process in the window correlation system of the present invention, as shown in FIG. 7B.

Illustrated in FIG. 7C is a flow chart of an example of the static tree structure synchronization process 440 in the remote sharedapp process 400, referenced in FIG. 7B.

With regard to FIG. 7C, the static tree structure synchronization process 440, in the remote sharedapp process 400, receives a synchronized tree request at step 441. At step 442, the static tree structure synchronization process 440 gets the first or next tree on the lostforest. At step 443, the signature is computed for the tree obtained at step 442. At step 444, the signature computed at step 443 is compared with the signature received from the local sharedapp process 200 at step 441.

If, at step 445, the signature computed at step 443 does not match the signature received from the local sharedapp process 200 at step 441, the static tree structure synchronization process 440 proceeds to step 446 and leaves the tree for which the signature was computed on the lostforest. The static tree structure synchronization process 440 also sets a reply flag indicating that a failure has occurred at step 446. At step 447, the static tree structure synchronization process 440 determines whether each tree in the lostforest for the remote shared process 400 has been attempted to be matched. If there are more trees on the lostforest the static tree structure synchronization process 440 returns to 442 to get the next tree off the lostforest.

If it is determined at step 447 that each tree on the lostforest has been compared with the tree signature received from the local sharedapp process 200, the static tree structure synchronization process 440 sends a synchronized tree reply back to the local sharedapp process 200 at step 453. The static tree structure synchronization process 440 then exits at step 459.

However, if it is determined at step 445, that the signature received from the local sharedapp process 200 matches the signature computed at step 443, the static tree structure synchronization process 440 indexes the tree at step 451. The static tree structure synchronization process 440 also allocates the indexes for the found window array and assigns an index for each window in the tree at step 451. At step 452, the current tree is placed on the foundforest and a reply flag indicating success is set at step 452. The static tree structure synchronization process 440 sends the synchronized tree reply back to the local sharedapp process 200 at step 453 and exits at step 459.

Figure 7D:
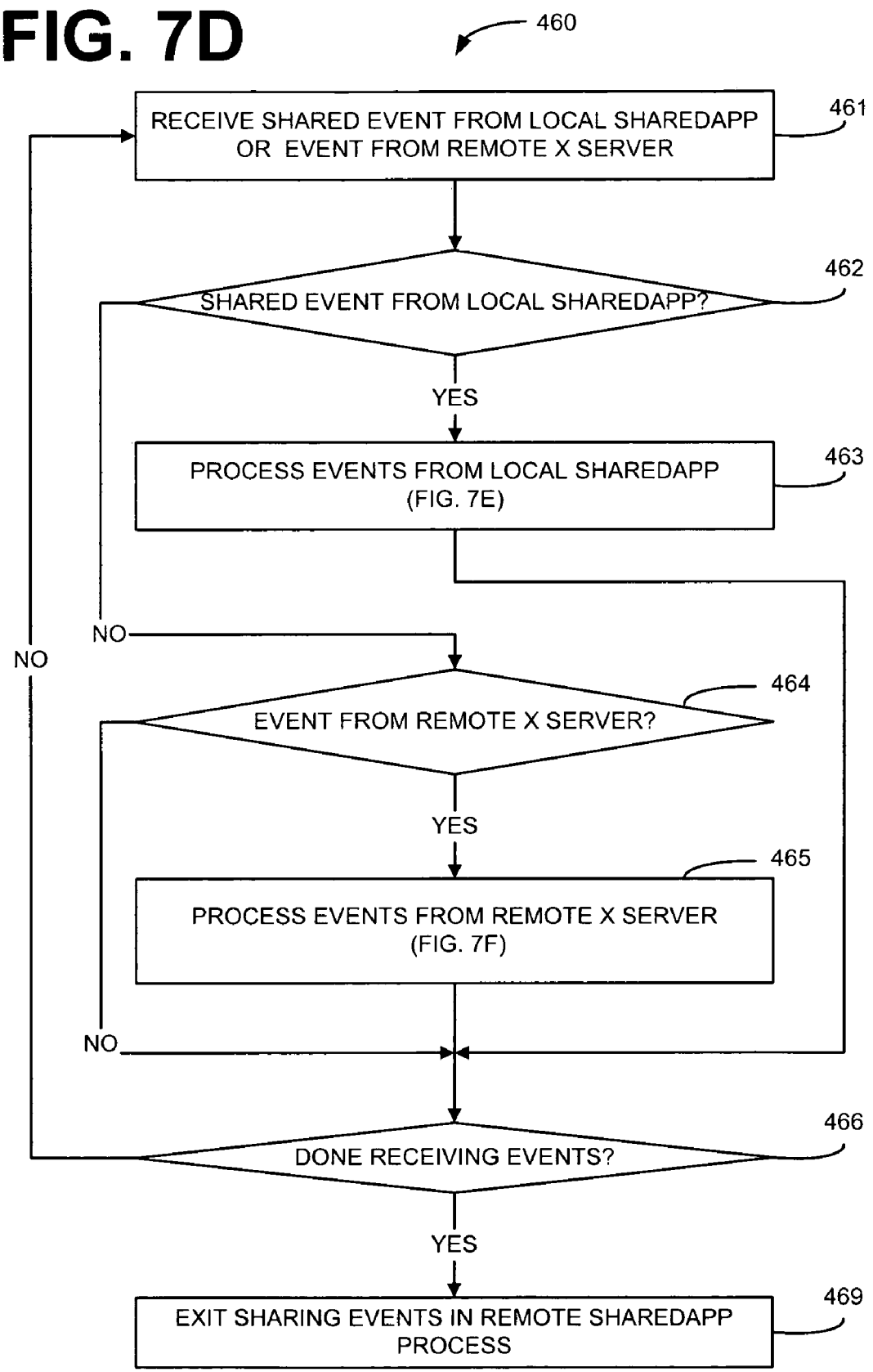
FIG. 7D is a flow chart of an example of the share events process in the remote sharedapp process in the window correlation system of the present invention, as shown in FIG. 7A.

Illustrated in FIG. 7D is a flow chart of an example of the share events process 460 in the remote sharedapp process 400 in the window correlation system 60 of the present invention, as shown in FIG. 7A.

At step 461 in FIG. 7D, the sharing events process 460 and the remote sharedapp process 400 receives a shared event from the local sharedapp process 200, or an event from the remote X server 600. At step 462, the sharing events process 460 determines if the shared event is from the local sharedapp process 200. If the event is from the local sharedapp process 200, the shared events process 460 processes the event received from the local sharedapp process 200 at step 463. The processing of the shared events from the local sharedapp process 200 is hereindefined in further detail with regard to FIG. 7E. After processing the shared events from the local sharedapp process 200 at step 463, the remote sharedapp process 400 skips to step 466 to determine whether the sharing events process 460 is finished receiving events.

If it is determined at step 462 that the event received is not a shared event from a local sharedapp process 200, the sharing events process 460 proceeds to step 464 to determine if the event received was from the remote X server 600. If the event was not from the remote X server 600, the sharing events process 460 proceeds to step 466 to determine if the sharing events process 460 is finished receiving events.

If the event received at step 461 is from a remote X server 600, the sharing events process 460 processses the event received from the remote X server 600 at step 465. The processing of events from the remote X server 600 is herein defined in further detail with regard to FIG. 7F. After processing the event from the remote X server 600, the sharing events process 460 proceeds to step 466 to determine if the sharing events process 460 is finished receiving events.

If it is determined at step 466 that the sharing events process 460 is not finished receiving events, the sharing events process 460 returns to repeat steps 461 through 466. If it is determined at step 466 that the sharing events process 460 is finished receiving events, the sharing events process 460 exits at step 469.

Illustrated in FIG. 7E is a flow chart of an example of the processing of local sharedapp events process 480 in the remote sharedapp process 400, referenced in FIG. 7D.

First, at step 481 in FIG. 7E, the processing of local sharedapp events process 480 receives the shared events from the local sharedapp process 200. At step 482, the local sharedapp events process 480 determines if the event received from the local sharedapp process 200 is a device-input event. If it is determined that the event received is not a device-input event, the processing of local sharedapp events process 480 skips to step 485 herein defined below.

If it is determined at step 482 that the event received from the local sharedapp process 200 is a device-input event, then the processing of local sharedapp events process 480 next determines, at step 483, if the device-input event is with regard to a window that is synchronized. If it is determined at step 483 that the device-input event received from the local sharedapp process 200 at step 481 is not associated with a synchronized window, the processing of local sharedapp events process 480 returns to step 481 to receive the next shared event from the local sharedapp process 200.

If it is determined at step 483, that the device-input event received at step 481 is a device-input event associated with a synchronized window, the local sharedapp events process 480 injects the event into the remote X server 600 at step 484. The local sharedapp events process 480 then returns to step 481 to receive the next shared event from the local sharedapp process 200.

At step 485, the local sharedapp events process 480 determines if the event received from the local sharedapp process 200 is a synchronized tree request. If the event received from the local sharedapp process 200 is not a synchronized tree request, the local sharedapp events process 480 proceeds to step 491 to determine if another sharedapp request was received.

When it is determined at step 485 that the event received at step 481 is a synchronized tree request, the local sharedapp events process 480 synchronizes the tree structure for the synchronized window in the remote sharedapp process 400 and the local sharedapp process 200. This synchronization tree request is herein defined in further detail with regard to FIG. 7G. After performing the synchronization of the tree structure for the synchronized window in the remote sharedapp process 400 and the local sharedapp process 200, the local sharedapp events process 480 returns to step 481 of FIG. 7E to receive the next shared event from the local sharedapp process 200.

In step 491, the processing of local sharedapp events process 480 determines if there is another sharedapp request. If it is determined in step 491 that the event received at step 481 is not another sharedapp request, the local sharedapp events process 480 proceeds to step 493 to determine if the local sharedapp events process 480 is finished receiving events.

If it is determined at step 491 that the event received at step 481 was another sharedapp request, the local sharedapp events process 480 processes the sharedapp request at step 492. The local sharedapp events process 480 then returns to step 481, to receive the next shared event from the local sharedapp process 200.

At step 493 the local sharedapp events process 480 determines if it is finished receiving events. If it is determined that there are more events to be received from the local sharedapp process 200, the local sharedapp events process 480 returns to repeat steps 481 through 493. If, however, it is determined that the local sharedapp events process 480 is done, the local sharedapp events process 480 exits at step 499.

Illustrated in FIG. 7F is a flow chart of an example of the process of events from remote X server process 500, in the remote sharedapp process 400, referenced in FIG. 7D.

The process of events from remote X server process 500 receives the shared event from the remote X server 600 at step 501 in FIG. 7F. At step 502, the process of events from remote X server process 500 determines if the event received from the remote X server 600 is a create window notification event. If it is determined at step 502 that the event received from the remote X server 600 is not a create window notification event, the process of events from remote X server process 500 skips to step 504.

If it is determined at step 502 that the event received from the remote X server 600 is a create window notification event, the process of events from remote X server process 500 adds a tree to the proper forest and disables remote user-input. The step of adding a tree to the proper forest and disabling the remote user-input process is herein defined with regard to FIG. 7H. After adding the tree to the proper forest and disabling the remote user-input at step 503, the process of events from remote X server process 500 returns to receive the next event from the remote X server 600.

At step 504 the process of events from remote X server process 500 determines if the event received from the remote X server 600 is a destroy window notification event. If it is determined at step 504 that the event received from the remote X server 600 is not a destroy window notification event, the process of events from remote X server process 500 skips to step 511.

If the process of events from remote X server process 500 determines, at step 504, that the event received from the remote X server 600 is a destroy window notification event, the tree signature for the appropriate application is marked as invalid. The process of events from remote X server process 500 also deletes the window, and removes the destroyed window tree from the current tree. If the destroyed tree is the top of a tree, the process of events from remote X server process 500 also removes the tree from the forest at step 505. After completing the processing at step 505, the process of events from remote X server process 500 returns to step 501 to receive the next shared event from the remote X server 600.

At step 511, the process of events from remote X server process 500 determines if the event received from the remote X server 600 is a button release event on an input-only window event. If it is determined at step 511 that the event received from the remote X server 600 is not a button release event on an input-only window, the process of events from remote X server process 500 skips to step 513.

If the process of events from remote X server process 500 determines at step 511 that the event received at step 501 is a button release event on an input-only window, the process of events from remote X server process 500 requests leadership for the remote user at step 512. Leadership is the ability to input commands and data into the shared application. The process of events from remote X server process 500 also enables, at step 512, the remote user input that was disabled at step 503. The process of events from remote X server process 500 enables the remote user-input by sending an event to the remote X server 600 instructing the remote X server 600 to unmap the input-only window over the top level window at step 512. After requesting leadership and enabling the remote user input, the process of events from remote X server process 500 returns to step 501 to receive the next shared event from the remote X server 600.

After requesting leadership, the local X server 100, the local sharedapp process 200, the remote X server 600 and the remote sharedapp process 400 exchange functionality. By doing so, the remote X server 600 and remote sharedapp process 400 become the new local X server 100 and local sharedapp process 200 respectively. In this switch, the remote X-server 600 and remote sharedapp process 400 are enabled for the functionality of the local X server 100 and local sharedapp process 200 respectively. The current local sharedapp process 200 and local X server 100 also switch functionality to that of the remote X server 600 and remote sharedapp process 400 respectively. Performing this switch process allows the remote X server 600 to accept input from the remote user for display on the local X server 100 to the local user.

At step 513, the process of events from remote X server process 500 determines if the event received from the remote X server 600 is another event. If it is determined, at step 513, that the event received from the remote X server 600 is not another event, the process of events from remote X server process 500 skips to step 515.

If the process of events from remote X server process 500 determines at step 513, that the event received from the remote X server 600 is another event, the process of events from remote X server process 500 processes the event at step 514. After completing the processing at step 514, the process of events from remote X server process 500 returns to step 501 to receive the next shared event from the remote X server 600.

At step 515 the process of events from remote X server process 500 determines if it is finished receiving events. If the process of events from remote X server process 500 is not done receiving events, the process of events from remote X server process 500 returns to repeat steps 501 through 515. If the process of events from remote X server process 500 is done receiving events, it exits at step 519.

Figure 7G:
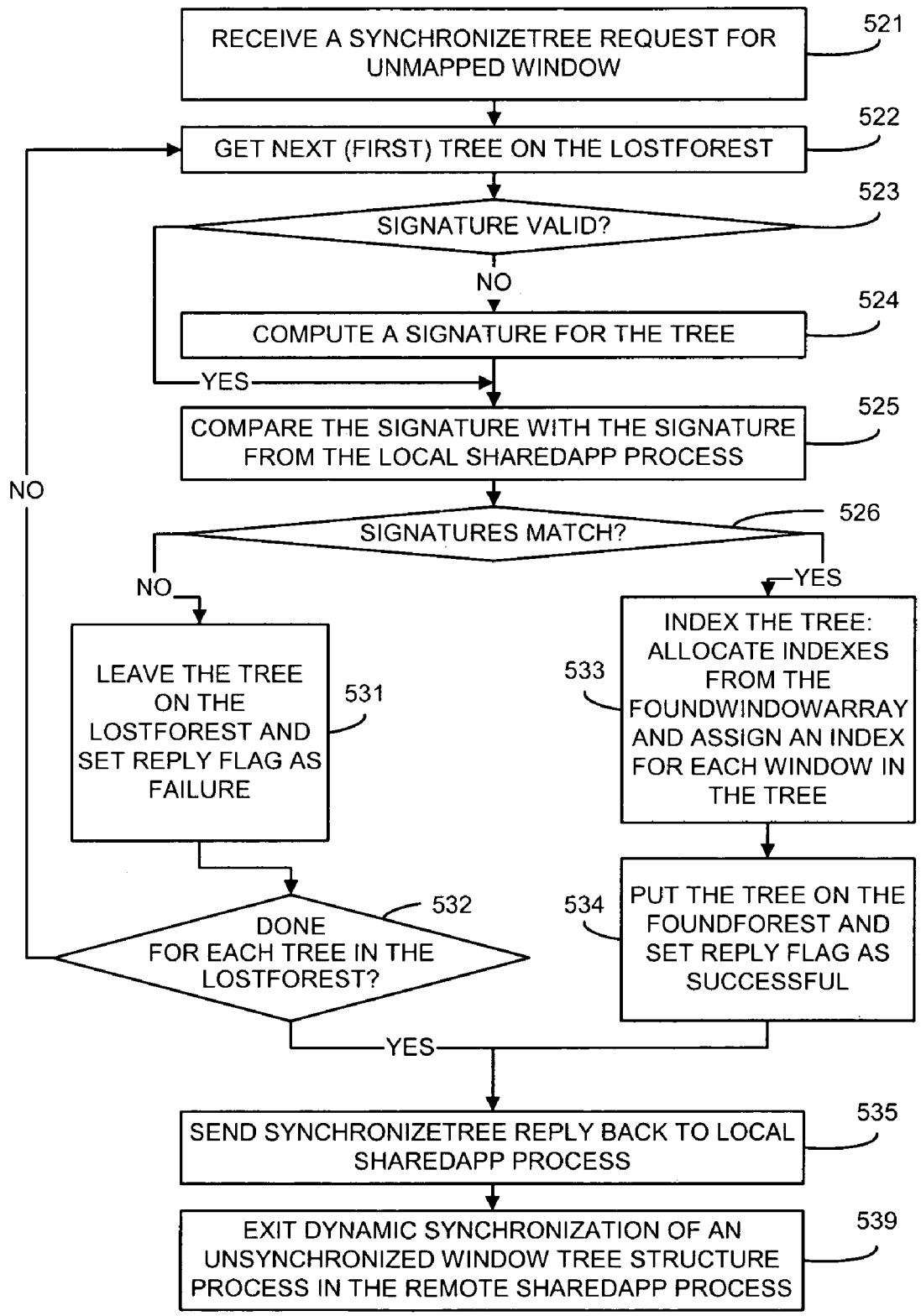
FIG. 7G is a flow chart of an example of the window tree structure dynamic synchronization process in the remote sharedapp process in the window correlation system of the present invention, as shown in FIG. 7E.

Illustrated in FIG. 7G is a flow chart of an example of the dynamic synchronization of an unsynchronized window tree structure process 520, in the remote sharedapp process 400 of the present invention, referenced in FIG. 7E.

With respect to FIG. 7G, the dynamic synchronization of an unsynchronized window tree structure process 520 receives a synchronized tree request for an unmapped window at step 521. At step 522, the dynamic synchronization of an unsynchronized window tree structure process 520 gets the first (or next tree during loop processing) on the lostforest.

At step 523, the dynamic synchronization of an unsynchronized window tree structure process 520 determines if the signature for the current tree (from the lostforest) is valid. If the signature for the current tree is valid, the dynamic synchronization of an unsynchronized window tree structure process 520 skips to step 525. If the signature for the current tree is not valid, the dynamic synchronization of an unsynchronized window tree structure process 520 computes the signature at step 522 for the current tree.

At step 525, the signature for the current tree is compared with the signature received at step 521 from the local sharedapp process 200. At step 526 the dynamic synchronization of an unsynchronized window tree structure process 520 determines if the signature received at step 521 matches the signature for the current tree.

If the signatures do not match, the dynamic synchronization of an unsynchronized window tree structure process 520 leaves the signature for the current tree on the lostforest at step 531. The dynamic synchronization of an unsynchronized window tree structure process 520 also sets, at step 531, a reply flag to indicate a failure. At step 532, the dynamic synchronization of an unsynchronized window tree structure process 520 determines if each tree in the lostforest for the remote sharedapp process 400 has been attempted. If there are more trees on the lostforest, the dynamic synchronization of an unsynchronized window tree structure process 520 returns to step 522 to get the next tree from the lostforest. If it is determined at step 532 that the signature for each tree on the lostforest has been compared with the tree signature received from the local sharedapp process 200, the dynamic synchronization of an unsynchronized window tree structure process 520 sends a synchronized tree failure reply back to the local sharedapp process 200 at step 535. The dynamic synchronization of an unsynchronized window tree structure process 520 then exits at step 539.

If, at step 526, it is determined that the signature received from the local sharedapp process 200 matches the signature for the current tree on the lostforest, the dynamic synchronization of an unsynchronized window tree structure process 520 indexes the tree at step 533. The dynamic synchronization of an unsynchronized window tree structure process

520 also allocates the indexes for the found window array and assigns an index for each window in the tree at step 533. At step 534, the current tree is placed on the foundforest and a reply flag indicating success is set at step 534. The dynamic synchronization of an unsynchronized window tree structure process 520 sends the synchronized tree successful reply back to the local sharedapp process 200 at step 535 and exits at step 539.

Figure 7H:
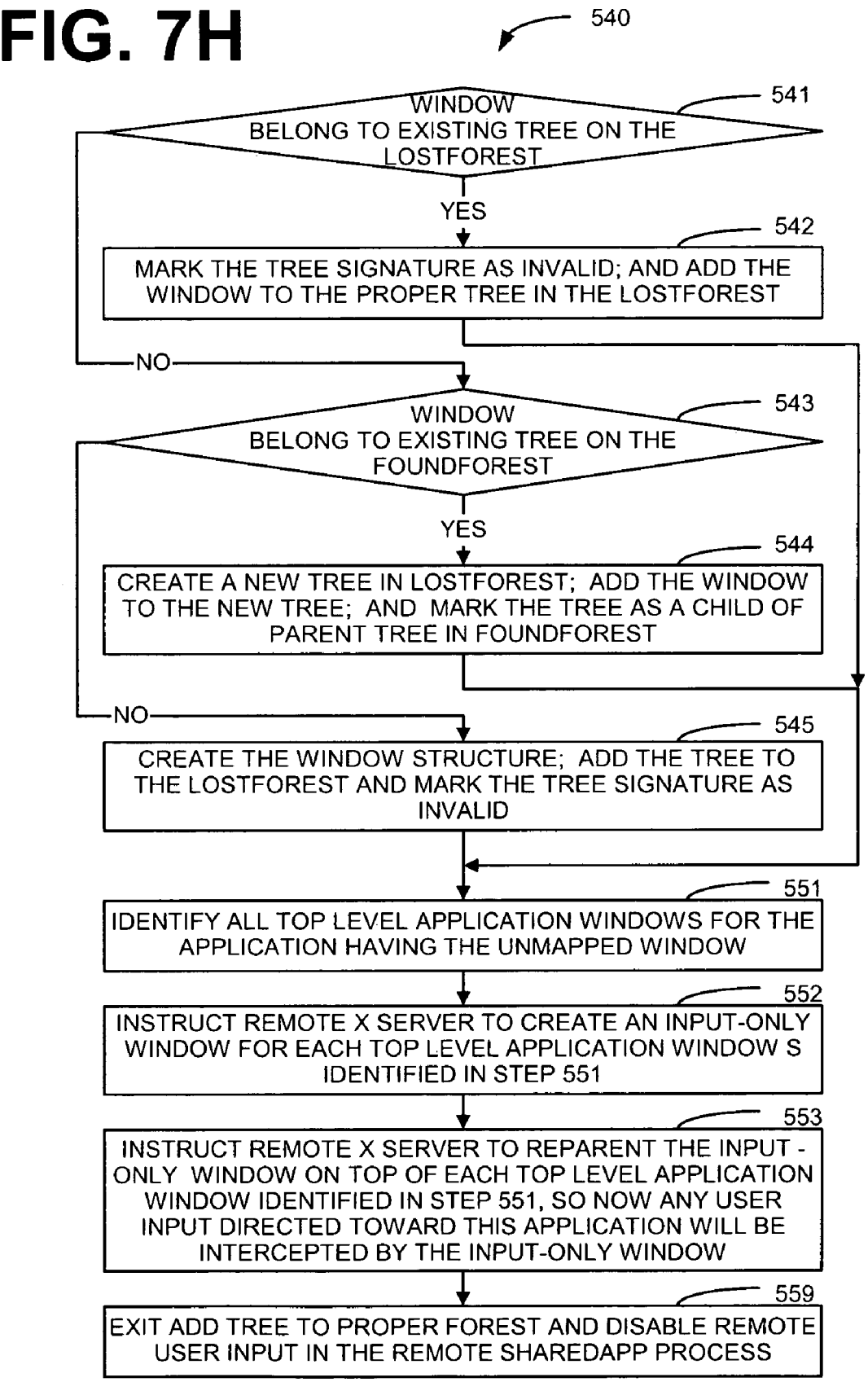
FIG. 7H is a flow chart of an example of the add tree to proper forest and disable remote user input process in the remote sharedapp process in the window correlation system of the present invention, as shown in FIG. 7H.

Illustrated in FIG. 7H is a flow chart of an example of the add tree to proper forest and disable remote user input process 540, in the remote sharedapp process 400 of the present invention, referenced in FIG. 7F.

First, at step 541 in FIG. 7H, the add tree to proper forest and disable remote user input process 540, determines if the window created from the event received at step 501 (FIG. 7F.), belongs to an existing tree on the lostforest. If the window does belong to an existing tree on the lostforest, the tree signature for the window is marked as invalid and the window is added to the proper tree in the lostforest at step 542. After marking the tree signature as invalid and adding the window to the proper tree in the lostforest, the add tree to proper forest and disable remote user input process 540 then skips to step 551 to disable remote user input.

If it is determined at step 541 that the window does not belong to an existing tree on the lostforest, the add tree to proper forest and disable remote user input process 540 then determines, at step 543, if the window belongs to an existing tree on the foundforest. If the window does belong to an existing tree on the foundforest, the add tree to proper forest and disable remote user input process 540 creates a new tree. The add tree to proper forest and disable remote user input process 540 adds the window to the new tree, and marks the newly created tree as a child of the parent tree located in the foundforest at step 544. The add tree to proper forest and disable remote user input process 540 then skips to step 551 to disable remote user input.

If it is determined at step 543 that the window does not belong to an existing tree on the foundforest, the add tree to proper forest and disable remote user input process 540 proceeds to step 545. At step 545, the add tree to proper forest and disable remote user input process 540 creates a new tree. The add tree to proper forest and disable remote user input process 540 then creates a window structure and adds the window to the newly created tree. The add tree to proper forest and disable remote user input process 540 also adds the new tree to the lostforest and marks the tree signature as invalid.

At step 551 the add tree to proper forest and disable remote user input process 540 identifies all the top level application windows for the application having the unmapped window. At step 552, the remote X server 600 is instructed to create an input-only window for each of the top level application windows identified in step 551. At step 553, the remote X server 600 is instructed to reparent the input-only window on top of each top level application window identified in step 551 so now any user input directed toward this application will be intercepted by the input-only window. The add tree to proper forest and disable remote user input process 540 then exits at step 559.

Figure 8B:
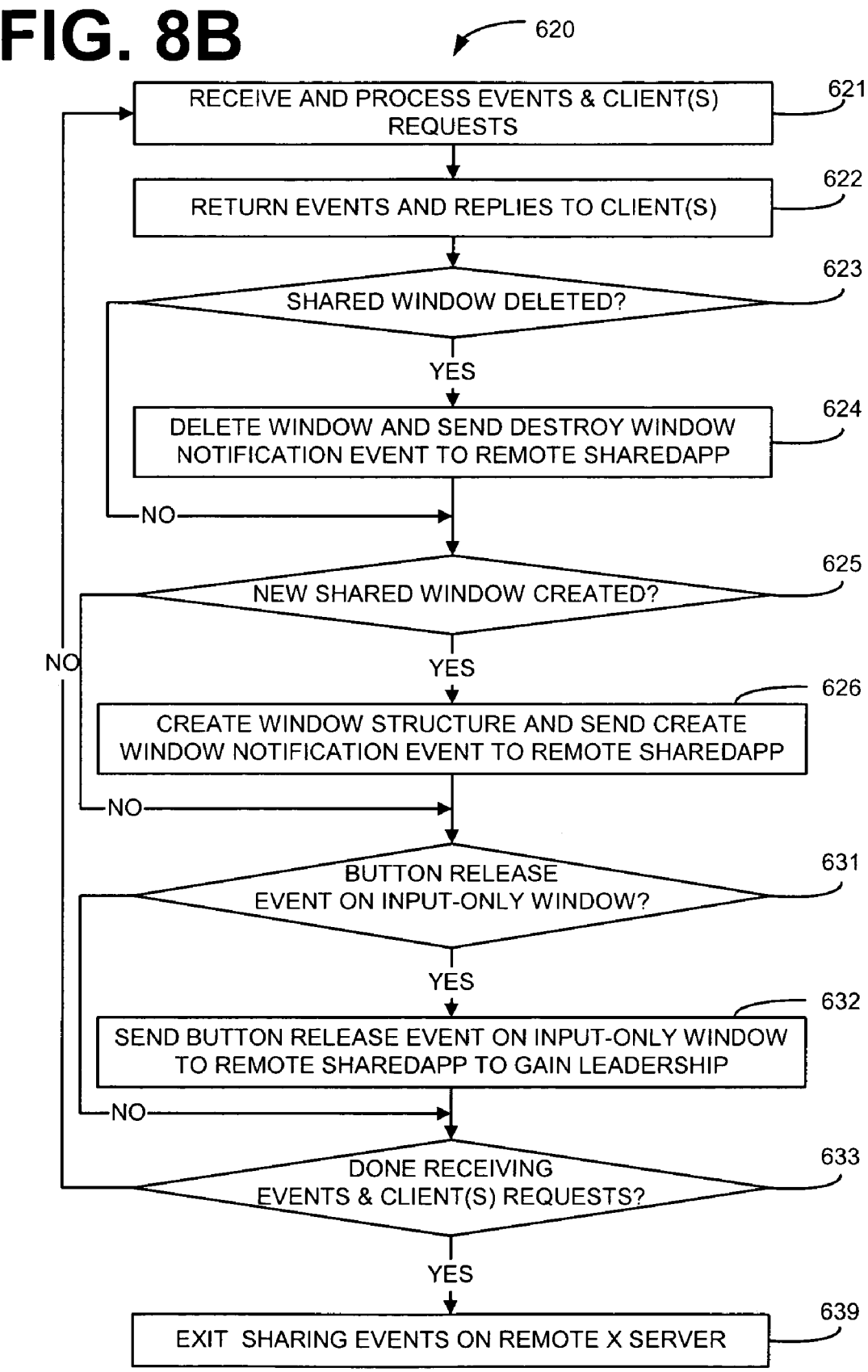

FIGS. 8A and 8B are flow charts collectively illustrating an example of the remote X server in the window correlation system 60 of the present invention, as shown in FIGS. 1, 2, 3B and 4.

With reference to FIG. 8A, the remote X server 600 is initialized at step 601. The remote client 53X then connects to the remote X server 600 at step 602. At step 603, the remote X server 600 receives and processes events and client requests. At step 604, the remote X server 600 returns events and replies to the remote clients 53X. At step 605, the remote X server 600 determines whether an event was received indicating whether application sharing has begun. If input received at step 603 does not indicate the start of application sharing, the remote X server 600 returns to repeat steps 603–605.

If input was received at step 603 indicating the start of application sharing, the remote X server 600 locates the remote application to be shared at step 606. At step 611, the remote X server 600 determines whether more than one remote shared application was located. If there was not more than one remote shared application located at step 611, the remote X server 600 proceeds to step 613 to process a request from the remote sharedapp process 400 for the window tree structures for the applications to be shared.

If, however, it is determined at step 611 that there were more than one shared applications located, the remote X server 600 requests, at step 612, that the remote user indicate which remote application is to be shared.

At step 613, the remote X server 600 processes the request from the remote sharedapp process 400 for the window tree structures for the remote applications to be shared. At step 614, the remote X server 600 returns the remote window tree structures for the remote application to be shared to the remote shared application process 400. At step 615, the remote X server 600 maintains the shared remote window tree structures with the remote shared application while processing shared events. This maintaining of shared remote window tree structures is hereindefined in further detail with regard to FIG. 8B.

After maintaining the remote shared window tree structures, the remote X server 600 determines, at step 616 of FIG. 8A, if there are any clients remaining. If it is determined, at step 616, that there are more clients remaining, the remote X server 600 returns to repeat steps 603 through 616. However, if it is determined at step 616 that there are no clients remaining, the remote X server 600 exits at step 619.

Illustrated in FIG. 8B is the sharing events on remote X server process 620, in the remote X server 600 of the present invention, referenced in FIG. 8A.

First, at step 621 in FIG. 8B, the sharing events on the remote X server process 620 receives and processes any received events or client(s) requests. At step 622, the sharing events on the remote X server process 620 returns events and replies to the client(s).

At step 623, the sharing events on remote X server process 620 determines if a shared window was deleted. If a shared window was not deleted, the sharing events on remote X server process 620 proceeds to step 625. If, however, it is determined at step 623 that a shared window was deleted, the sharing events on remote X server process 620, deletes the window and sends a destroy window notification event to the remote sharedapp process 400 at step 624. The sharing events process on remote X server 620 then proceeds to step 625.

At step 625, the sharing events on remote X server process 620 determines if a new shared window was created. If a new shared window was not created, then the sharing events on remote X server process 620 proceeds to step 631. If a new shared window was created, then the sharing events on remote X server process 620 creates a window structure for the shared new window created and sends a create window notification event to the remote shared application process at step 626.

At step 631, the sharing event on remote X server process 620 determines if a button release event for an input-only window was received. If a button release event was not received, then the sharing events on remote X server process 620 proceeds to step 633. If a button release event on an input-only window was received, then the sharing events on the remote X server process 620 sends a button release event on the input-only window to the remote shared application process 400 in order to gain leadership at step 632. The sharing events process on remote X server 620 then proceeds to step 633.

At step 633, the sharing events on the remote X server process 620 determines if it is finished receiving events and client requests. If the sharing events on the remote X server process 620 determines that it is not finished receiving events and client requests, then the sharing events on remote X server process 620 returns to repeat steps 621 through 633. If, however, it is determined at step 633 that the sharing events on remote X server process 620 is finished, the process exits at step 639.

In the preferred embodiment, the pacing event-sharing collaboration across multiple distributed applications system of the present invention can be implemented in hardware, software, firmware, or a combination thereof. In the preferred embodiment(s), the window correlation system is implemented in software or firmware that is stored in a memory and that is executed by a suitable instruction execution system.

The pacing event-sharing collaboration within the windows correlation system 60 comprises an ordered listing of executable instructions for implementing logical functions. These executable instructions can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the scope and principles of the invention. All such modifications and variations are intended to be included herein within the scope of the present invention and protected by the following claims.

We claim:

1. A system for pacing the transmission of locally generated input events from a local application that are to be shared with at least one corresponding remote application during a collaborative communication session, the system comprising:
   a local application sharing logic coupled to the local application, said local application sharing logic configured to:
   receive one or more locally generated input events to be shared from said local application with the at least one corresponding remote application, wherein the input events are injected into the at least one corresponding remote application such that it appears as if the locally generated events were generated by input devices attached to the at least one corresponding remote application;
   generate one or more echo events;
   transmit the locally generated input events with said echo events to said remote application, wherein transmission of a locally generated input event with an echo event is recorded via an echo event transmit time and receipt of the returned echo event from the at least one corresponding remote application is recorded via an echo event receive time; and
   pace the transmission of locally generated input events in accordance with the echo event receive time and a respective echo event transmit time.

2. The system of claim 1, wherein said local application sharing logic is configured to transmit echo events to a remote application sharing logic at predetermined intervals.

3. The system of claim 2, wherein said remote application sharing logic further comprises:
   remote pacing logic configured to:
   receive said echo events; and
   transmit said echo events to said remote application.

4. The system of claim 1, wherein said local application sharing logic is configured to calculate a difference of the echo event receive time and the respective echo event transmit time.

5. The system of claim 4, wherein said local application sharing logic further comprises:
   local message generation logic configured to generate a message for said local application.

6. The system of claim 5, wherein said message for said local application is a pacing meter.

7. The system of claim 6, wherein said pacing meter utilizes color to indicate the difference.

8. A computer implemented method for pacing the transmission of one or more input events associated with a local application that are shared with at least one corresponding remote application during a collaborative communication session, the method comprising the steps of:
   communicating a current state of a local window tree;
   transmitting said one or more input events to be shared from said local application, wherein the input events are injected into the at least one corresponding remote application such that it appears as if locally generated events were generated by input devices attached to the at least one corresponding remote application; providing a local application sharing logic configured to receive said input events to be shared, said local application sharing logic further configured to:
   generate one or more echo events;

controllably insert the echo events with said input events to be shared;

transmit said input events to be shared together with said inserted echo events to a remote application responsive to the local window tree; and receive said echo events and pace the transmission of said input events to be shared in accordance with an echo delay wherein said echo delay comprises a difference between an echo event receive time and a respective echo event transmit time, wherein transmitting each of said echo events is associated with a respective echo event transmit time and receipt of the returned echo event from the at least one corresponding remote application is associated with a respective echo event receive time.

9. The method of claim 8, further comprising the steps of: transmitting said echo events to said remote application at predetermined intervals.

10. The method of claim 8, further comprising the step of: generating a warning message.

11. The method of claim 10, further comprising the step of:

forwarding said warning message to said local application.

12. The method of claim 11, wherein said warning message comprises a representation of a meter.

13. A system for pacing the transmission of one or more input events associated with a local application that are shared with at least one corresponding remote application during a collaborative communication session, said pacing system comprising:

means for communicating a current state of a local window tree;

means for transmitting said one or more input events to be shared from said local application responsive to the local window tree;

means for generating one or more echo events;

means for inserting said echo events along with said input events to be shared; and means for pacing the transmission of said input events to be shared, said means for pacing responsive to an echo delay, wherein said means for pacing further comprises:

means for receiving returned echo events; and means for calculating a difference of an echo event receive time recorded when a returned echo event is received by the means for pacing transmission and a respective echo event transmit time recorded when an echo event is transmitted to the at least one corresponding remote application, said difference representing the echo delay.

14. The system of claim 13, wherein said means for pacing further comprises:

means for transmitting a pacing event to said remote application sharing logic at predetermined intervals.

15. A system for pacing the transmission of one or more input events associated with a local application that are shared with at least one corresponding remote application during a collaborative communication session, said pacing system comprising:

means for communicating a current state of a local window tree;

means for transmitting said one or more input events to be shared from said local application responsive to the local window tree;

means for generating one or more echo events;

means for inserting said echo events along with said input events to be shared;

means for pacing the transmission of said input events to be shared, said means for pacing responsive to an echo delay, wherein said means for pacing further comprises:

means for receiving returned echo events; and means for calculating a difference of an echo event receive time recorded when a returned echo event is received by the means for pacing transmission and a respective echo event transmit time recorded when an echo event is transmitted to the at least one corresponding remote application, said difference representing the echo delay; and means for forwarding a warning message to said local application.

16. The system of claim 15, wherein said warning message comprises a representation of a meter.

17. The system of claim 16, wherein said meter uses color to indicate said echo delay.

* * * * *